(12) United States Patent
Kim et al.

(10) Patent No.: US 12,219,318 B2
(45) Date of Patent: Feb. 4, 2025

(54) WEARABLE DEVICE COMPRISING SPEAKER

(71) Applicant: SAMSUNG ELECTRONICS CO., LTD., Suwon-si (KR)

(72) Inventors: Dongsung Kim, Suwon-si (KR); Yongbum Kim, Suwon-si (KR); Duckyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 248 days.

(21) Appl. No.: 17/849,064

(22) Filed: Jun. 24, 2022

(65) Prior Publication Data
US 2023/0087161 A1     Mar. 23, 2023

Related U.S. Application Data

(63) Continuation of application No. PCT/KR2022/007753, filed on May 31, 2022.

(30) Foreign Application Priority Data

Sep. 18, 2021 (KR) .......................... 10-2021-0125318

(51) Int. Cl.
    *H04R 1/10*      (2006.01)

(52) U.S. Cl.
    CPC ........... *H04R 1/1066* (2013.01); *H04R 1/105* (2013.01)

(58) Field of Classification Search
    CPC ......... A61B 5/7405; B65D 25/02; G06F 1/16; G06F 3/017; G10L 15/30; H02J 7/0044;
(Continued)

(56) References Cited

U.S. PATENT DOCUMENTS

| | | |
|---|---|---|
| 8,116,501 B2 | 2/2012 | Kusada et al. |
| 8,229,521 B2 | 7/2012 | Kang et al. |

(Continued)

FOREIGN PATENT DOCUMENTS

| | | |
|---|---|---|
| CN | 103596099 | 2/2014 |
| CN | 204721552 | 10/2015 |

(Continued)

OTHER PUBLICATIONS

Search Report and Written Opinion dated Sep. 8, 2022 issued in International Patent Application No. PCT/KR2022/007753.

(Continued)

*Primary Examiner* — Gerald Gauthier
(74) *Attorney, Agent, or Firm* — Nixon & Vanderhye, P.C.

(57) ABSTRACT

According to an embodiment, a wearable device includes: a case including an inner space and including a through-hole connecting the inner space and an outside of the wearable device; a speaker disposed within the case and configured to output audio; and a nozzle including audio path extending from the inner space to the outside of the wearable device, inserted to the through-hole, rotatably coupled to the case within the through-hole; wherein, the case may include a seating portion supporting a part of the nozzle disposed inside the case and formed along the periphery of the through-hole; and a guiding portion disposed in the seating portion and configured to guide the rotation of the nozzle.

20 Claims, 16 Drawing Sheets

(58) Field of Classification Search
CPC ....... H02J 7/0045; H04R 1/021; H04R 1/023; H04R 1/10; H04R 1/1008; H04R 1/1016; H04R 1/1041; H04R 1/105; H04R 1/1058; H04R 1/1066; H04R 1/1075; H04R 1/1091; H04R 1/2823; H04R 1/32; H04R 1/345; H04R 2460/11; H04R 1/1083; H04R 3/14; H04R 9/063; H05K 1/181; H05K 5/00; G10K 11/175; H04B 1/3888
USPC .................................................. 381/334, 379
See application file for complete search history.

(56) References Cited

U.S. PATENT DOCUMENTS

| | | | |
|---|---|---|---|
| 8,571,227 | B2 | 10/2013 | Donaldson et al. |
| 10,085,084 | B2* | 9/2018 | Kim ................. H04R 1/1016 |
| 10,165,344 | B2* | 12/2018 | Imai ................. H04R 1/1008 |
| 10,231,045 | B2 | 3/2019 | Lee et al. |
| 10,785,556 | B2* | 9/2020 | Na ................... H04R 1/1016 |
| 10,841,683 | B2* | 11/2020 | Trainer ............. H04R 1/1016 |
| 11,026,009 | B2 | 6/2021 | Ma |
| 11,095,973 | B1* | 8/2021 | Zalisk ................ G10K 11/175 |
| 11,102,563 | B2* | 8/2021 | Stanley ............... H04R 1/023 |
| 11,381,898 | B2 | 7/2022 | Choi et al. |
| 11,765,259 | B2* | 9/2023 | Lee ...................... H05K 5/00 381/334 |
| 11,944,172 | B2* | 4/2024 | Chawan .............. B65D 25/02 |
| 11,962,966 | B2* | 4/2024 | Park ..................... H05K 1/181 |
| 2006/0098836 | A1 | 5/2006 | Sabick et al. |
| 2007/0098201 | A1 | 5/2007 | Chen |
| 2008/0170714 | A1 | 7/2008 | Major |
| 2010/0098285 | A1 | 4/2010 | Kusuda et al. |
| 2012/0155689 | A1 | 6/2012 | Milodzikowski et al. |
| 2017/0280230 | A1* | 9/2017 | Kim ................. H04R 1/1016 |
| 2019/0014403 | A1* | 1/2019 | Lee .................. H04R 1/1066 |
| 2019/0020946 | A1* | 1/2019 | Tu .................... H04R 1/345 |
| 2019/0158945 | A1* | 5/2019 | Igarashi ........... H04R 1/1016 |
| 2019/0348041 | A1* | 11/2019 | Cella ................... G10L 15/30 |
| 2020/0021903 | A1* | 1/2020 | Trainer ............... H04R 1/105 |
| 2020/0052513 | A1* | 2/2020 | Zhan .................. H02J 7/0044 |
| 2020/0053449 | A1* | 2/2020 | Ito .................... H04R 1/1016 |
| 2020/0186907 | A1* | 6/2020 | Kim ................... H04R 1/2823 |
| 2020/0221203 | A1* | 7/2020 | Tilton ................. H02J 7/0045 |
| 2021/0007669 | A1* | 1/2021 | Jin ...................... A61B 5/7405 |
| 2021/0008331 | A1* | 1/2021 | Jin ...................... H04R 1/1075 |
| 2021/0058694 | A1 | 2/2021 | Sampei |
| 2021/0069490 | A1* | 3/2021 | Hanson .............. H04R 1/1058 |
| 2021/0250676 | A1* | 8/2021 | Kim ................... H04R 1/1016 |
| 2021/0321187 | A1* | 10/2021 | Imamura ............ H04R 1/1066 |
| 2021/0368254 | A1* | 11/2021 | Kemmerer ........... G06F 3/017 |
| 2021/0373593 | A1* | 12/2021 | Fang ................... H04R 1/1091 |
| 2022/0279263 | A1* | 9/2022 | Le ...................... H04R 1/1041 |
| 2022/0312124 | A1* | 9/2022 | Ko ....................... H04R 9/063 |
| 2022/0345816 | A1* | 10/2022 | Park ..................... H04R 3/14 |
| 2023/0011476 | A1* | 1/2023 | Zalisk ................. H04R 1/1016 |
| 2023/0087161 | A1* | 3/2023 | Kim ..................... H04R 1/10 381/379 |
| 2023/0217152 | A1* | 7/2023 | Park .................... H04R 1/1083 381/374 |

FOREIGN PATENT DOCUMENTS

| | | |
|---|---|---|
| CN | 108810716 | 11/2018 |
| CN | 211959493 | 11/2020 |
| CN | 212909974 | 4/2021 |
| JP | H07154888 | 6/1995 |
| JP | 5079881 | 11/2012 |
| KR | 10-2005-0118375 | 12/2005 |
| KR | 10-0952215 | 4/2010 |
| KR | 10-1300265 | 8/2013 |
| KR | 10-2227132 | 3/2021 |
| WO | 2017183027 | 10/2017 |

OTHER PUBLICATIONS

Extended Search Report dated Nov. 26, 2024 in European Patent Application No. 22870085.2.

* cited by examiner

WEARABLE DEVICE COMPRISING SPEAKER

CROSS-REFERENCE TO RELATED APPLICATIONS

This application is a continuation of International Application No. PCT/KR2022/007753 designating the United States, filed on May 31, 2022, in the Korean Intellectual Property Receiving Office and claiming priority to Korean Patent Application No. 10-2021-0125318, filed on Sep. 18, 2021, in the Korean Intellectual Property Office, the disclosures of which are incorporated by reference herein in their entireties.

BACKGROUND

Field

The disclosure relates to a wearable device comprising a speaker.

Description of Related Art

The wearable device may be worn on a part of a user's body and may provide information to the user. For example, the wearable device may comprise a speaker and may be configured to provide audio information to the user through the speaker while being worn on the user's body.

The wearable device providing audio information may be classified according to a form worn on a user's ear. For example, the wearable device may be classified into a headphone type worn to cover the user's pinna, an open type worn to over the user's concha, and a kernel type in which a part is worn to be inserted into the user's external auditory meatus.

A wearable device such as an earphone may comprise a case in which a speaker is embedded, a nozzle for transmitting sound output from the case to the outside of the wearable device, and an ear tip coupled to one end of the nozzle. The wearable device may be worn by the user such that a part of the nozzle is inserted into the user's ear external auditory meatus and one area of the case is located on the user's concha. Since the shape of the ear is different for each user, the user may feel uncomfortable by a nozzle inserted into the external auditory meatus or an area of the case positioned in the concha after wearing the wearable device. The user may replace the ear tip with another ear tip to relieve discomfort, but when an ear tip suitable for the user's ear is not provided, the discomfort may be difficult to relieve.

A wearable device, in addition to replacing an ear tip, needs a method for improving a user's wearing comfort.

The technical problems to be achieved in this document are not limited to those described above, and other technical problems not mentioned herein will be clearly understood by those having ordinary knowledge in the art to which the present disclosure belongs, from the following description.

SUMMARY

According to an embodiment, a wearable device may comprise: a case including an inner space and including a through-hole connecting the inner space and the outside of the wearable device; a speaker disposed within the case and configured to output audio; and a nozzle including audio path extending from the inner space to the outside of the wearable device, inserted in the through-hole, and rotatably coupled to the case within the through-hole; wherein, the case may include: a seating portion supporting a part of the nozzle disposed inside the case and formed along the periphery of the through-hole; and a guide portion disposed to the seating portion and guiding the rotation of the nozzle.

According to an embodiment, a wearable device may comprise: a case including an inner space and comprising a through-hole connecting the inner space and the outside of the wearable device; a speaker disposed in the case and configured to output audio; a nozzle coupled to a region of the case including the through-hole, and comprising an acoustic duct connecting the through-hole and the outside; a plurality of adjustment pieces configured to press one surface of the nozzle, and passing through each of a plurality of fastening holes formed in the nozzle; and a plurality of elastic pieces comprising an elastic material surrounding each of the plurality of the adjustment pieces and configured to press the other surface of the nozzle facing one surface of the nozzle; wherein, at least one of the plurality of adjustment pieces may be configured to move with respect to the case so that the length of the elastic piece corresponds to at least one of the plurality of adjustment pieces is changed to adjust a position of the nozzle with respect to the case.

A wearable device comprising a case in which a speaker outputting sound is embedded and a nozzle including an audio path for transmitting the output sound to the outside can improve a user's wearing comfort by disposing the nozzle to be movable in the case.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
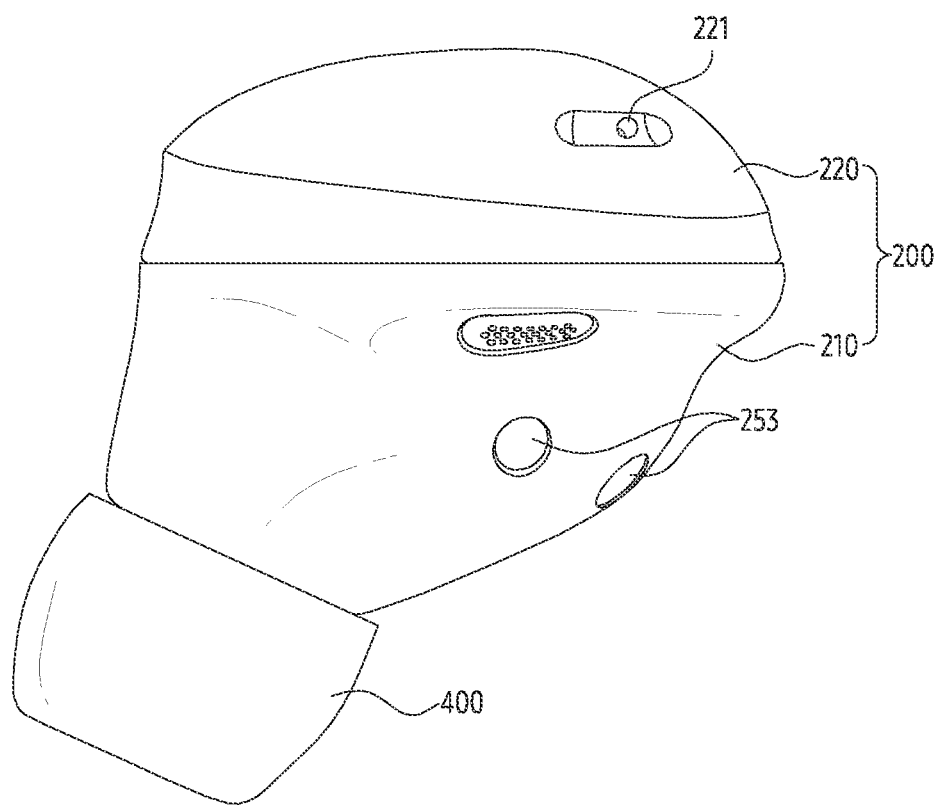
FIG. 1A is a perspective view of a wearable device according to an embodiment.
Figure 1B:
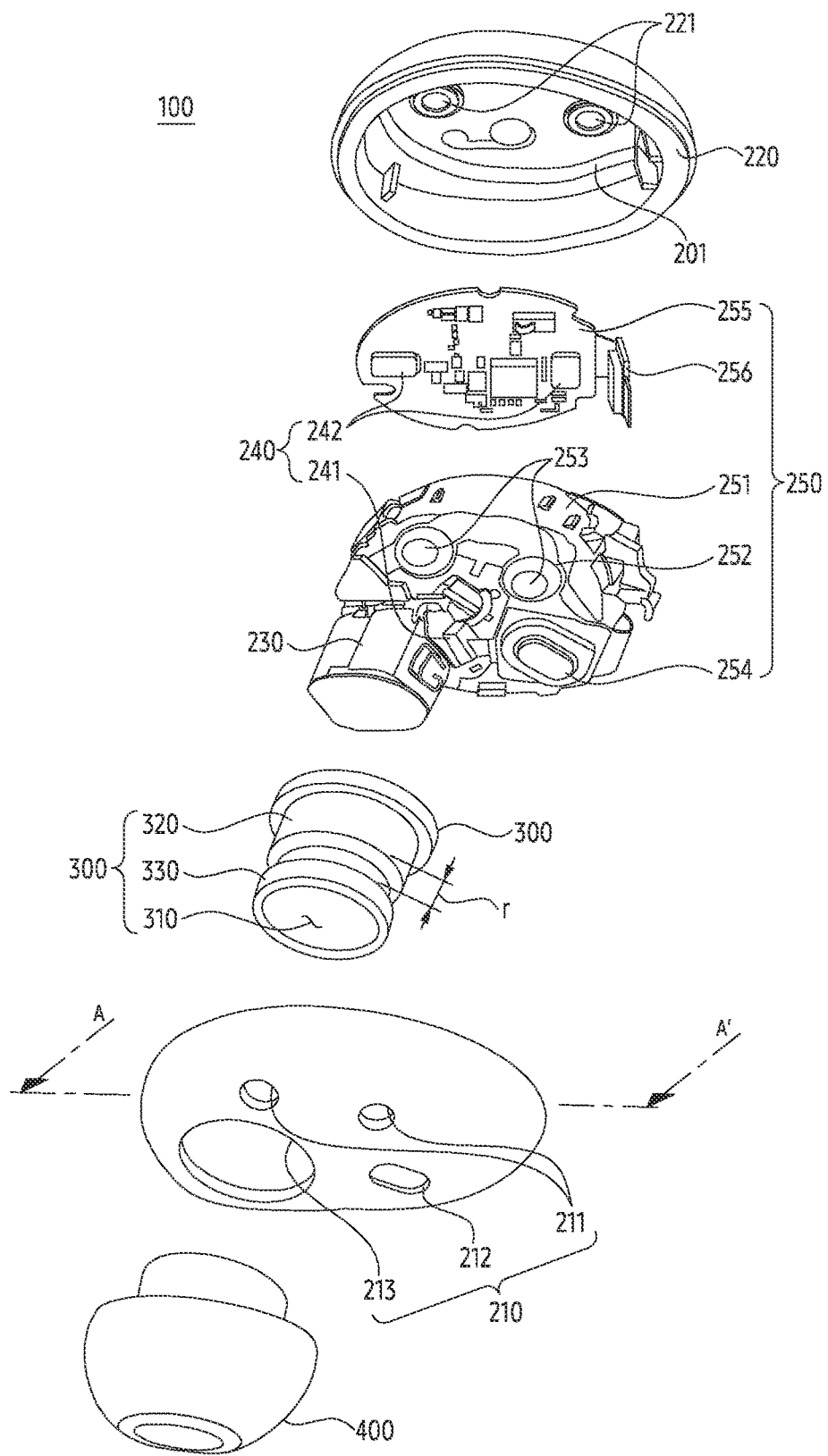
FIG. 1B is an exploded perspective view of the wearable device shown in FIG. 1A according to an embodiment.

FIG. 1A is a perspective view of a wearable device according to an embodiment, and FIG. 1B is an exploded perspective view of the wearable device shown in FIG. 1A.

Referring to FIGS. 1A and 1B, the wearable device 100 may comprise a case 200, a nozzle 300, and/or an ear tip 400.

According to an embodiment, the wearable device 100 may be worn on a part of the user's body to provide audio information to the user. For example, the wearable device 100 may provide audio information to the user by inserting a portion into the user's ear. A partial area of the wearable device 100 including the ear tip 400 may be inserted into the user's ear and may transmit audio information provided from the sound output device disposed inside the wearable device 100 to the user through the nozzle 300 and the ear tip 400. According to an embodiment, the wearable device 100 may provide audio information to a user wearing the wearable device 100 based on a signal received from an external device. For example, the wearable device 100 may receive a signal related to audio information from an external electronic device (e.g., a portable communication device (e.g., a smartphone), a computer device, a portable multimedia device, a portable medical device, a camera, another wearable device, or a home appliance). The wearable device 100 may establish a communication channel with an external electronic device and may receive a control signal for controlling the wearable device 100 as well as a signal related to audio information from the external electronic device.

According to an embodiment, the wearable device 100 may further include a communication module (e.g., including communication circuitry) (not illustrated) to communicate with an external device. The wearable device 100 may control the operation of internal components based on the signal received through the communication module. For example, the communication module may be a Bluetooth communication module, but is not limited thereto. The communication module may communicate with an external electronic device through a short-range communication network such as Bluetooth. The wearable device 100 may be connected to an external electronic device by wire. For example, the wearable device 100 may be connected to an interface of an external electronic device through a cable connected to the wearable device 100.

The signal related to audio information may include a signal related to music and voice to be provided to the user by the wearable device 100. The control signal may include signals such as sound control of the wearable device 100 and a request to update software installed in the wearable device 100. The wearable device 100 may receive data for software update.

According to an embodiment, the case 200 may form an outer surface that can be touched by a user's hand. According to an embodiment, the case 200 may form an inner space 201 in which various components of the wearable device 100 may be accommodated. According to an embodiment, the case 200 may include a first case 210 and/or a second case 220. The inner space 201 may be a space surrounded by the first case 210 and the second case 220 by coupling the first case 210 and the second case 220. The internal space 201 may further include instruments (e.g., brackets) capable of supporting electronic components that are components of the wearable device 100.

The first case 210 may be disposed to face the user's external auditory canal when the user wears the wearable device 100. According to an embodiment, a terminal hole 211 connecting the terminal 253 and the outside of the wearable device 100 may be formed at one side of the first case 210. The terminal 253 may be exposed to the outside of the first case 210 through the terminal hole 211. According to an embodiment, the first case 210 may include a sensor hole 212 connecting the wearing detection sensor 254 and the outside of the wearable device 100. The wearing detection sensor 254 may be a sensor capable of collecting information capable of detecting a user's wearing. The wearing detection sensor 254 may be exposed to the outside of the first case 210 through the sensor hole 212. According to an embodiment, the first case 210 may include a through hole 213 connecting the inner space 201 and the outside of the wearable device 100.

When the user wears the wearable device 100, the second case 220 may be disposed to face a direction opposite to a direction in which the first case 210 is disposed with respect to a boundary surface between the first case 210 and the second case 220. According to an embodiment, a microphone hole 221 connecting the inner space 201 in which the microphone 240 is disposed and the outside of the wearable device 100 may be formed at one side of the second case 220. According to an embodiment, the second case 220 may include a touch area configured to detect a user's touch. The user may control the operation of the wearable device 100 by touching the touch area of the second case 220. For example, wearable device 100 may include a touch sensor exposed to the outside in the touch area. The touch sensor may receive an external input for controlling the operation of the wearable device 100.

According to an embodiment, the first case 210 and the second case 220 may be coupled to each other to form an inner space 201 of the case 200. For example, the coupling method of the first case 210 and the second case 220 may be a snap-fit method, a screw coupling method, a magnetic force coupling method, an interference fit method, or the like, but is not limited thereto.

The speaker 230 may receive an electrical signal and output a sound or signal based on the received electrical signal. According to an embodiment, the speaker 230 may be disposed adjacent to the first case 210 to transmit the output sound to the outside of the wearable device 100.

Microphone 240 may receive an audio signal and generate an electrical signal based on the received audio signal. For example, the microphone 240 may obtain audio information transmitted through the nozzle 300. As another example, microphone 240 may be a feedback microphone for active noise cancellation (ANC) for removing noise. According to an embodiment, the microphone 240 may include an inner microphone 241 disposed to face the first case 210 and an outer microphone 242 disposed to face the second case 220. For example, the microphone 240 may be an electronic condenser microphone (ECM) or a micro electromechanical system (MEMS) but is not limited thereto.

The electronic component 250 may include an electrical circuit inside the wearable device 100. According to an embodiment, the electronic component 250 may include a battery 251, a first circuit board 252, a terminal 253, a wearing detection sensor 254, a second circuit board 255, and a connection part 256.

The battery 251 may supply power to at least one component of the wearable device 100. According to an embodiment, the battery 251 may include, for example, a non-rechargeable primary cell, a rechargeable secondary cell, or a fuel cell The first circuit board 252 may be disposed adjacent to the first case 210. According to an embodiment, the first circuit board 252 may be electrically connected to the speaker 230 and the inner microphone 241. According to an embodiment, a terminal 253 electrically connecting the battery 251 and an external electronic device may be disposed on the first circuit board 252. The terminal 253 may be disposed on the first circuit board 252 such that a portion of the terminal 253 passes through the terminal hole 211 formed in the first case 210 and is exposed to the outside of the wearable device 100. For example, the external device connected to the wearable device 100 through the terminal 253 may be a cradle (not illustrated) for supplying power to the battery 251. Terminal 253 may be connected to a terminal of an external device such as a cradle such as a charging device or a charging case of a wearable device. Terminal 253 may supply power to wearable device 100 through a terminal of an external electronic device. For example, the power supplied to the wearable device 100 may be used to charge the battery 251. The terminal hole 211 may be formed on the side surface of the wearable device 100 facing the seating surface of the external device when the wearable device 100 is seated on the external device. For example, when the wearable device 100 is seated in a state designated in the charging case of the wearable device 100, the terminal hole 211 may be formed at a position corresponding to the charging terminal among surfaces of the wearable device 100 in contact with the charging case. According to an embodiment, a wearing detection sensor 254 configured to detect whether the user wears the wearable device 100 may be disposed on the first circuit board 252. The wearing detection sensor 254 may be disposed on the first circuit board 252 such that a portion passes through the sensor hole 212 formed in the first case 210 and is exposed to the outside of the wearable device 100. The wearing detection sensor 254 may detect contact or access of a part of the user's body. For example, the wearing detection sensor 254 may detect when the wearable device 100 is inserted into the user's external auditory meatus. The wearing detection sensor 254 may refer, for example, a proximity sensor, but is not limited thereto. The wearing detection sensor 254 may include an ultrasonic sensor, an infrared sensor, a touch sensor, or a combination thereof.

The second circuit board 255 may be disposed to be spaced apart from the first circuit board 252 and adjacent to the second case 220. For example, the second circuit board 255 may be disposed on the other side of the battery 251 facing one side of the battery 251 on which the first circuit board 252 is disposed. According to an embodiment, the second circuit board 255 may be electrically connected to the external microphone 242. For example, the external microphone 242 may be disposed in one area of the second circuit board 255 to correspond to the position of the microphone hole 221 of the second case 220. For example, the first circuit board 252 and the second circuit board 255 may be at least one of a printed circuit board (PCB) and a flexible printed circuit board (FPCB).

The connection part 256 may electrically connect the first circuit board 252 and the second circuit board 255. According to an embodiment, the connection part 256 may surround a part of the sidewall of the battery 251 and extend from the first circuit board 252 to the second circuit board 255. The connection part 256 may be, for example, at least one of a flexible printed circuit board (FPCB) formed of a polyimide material and a metal wire.

The nozzle 300 may connect the inner space 201 of the case 200 to the outside of the wearable device 100. According to an embodiment, the nozzle 300 may be coupled to the case 200 by being inserted into the through hole 213. For example, the nozzle 300 may be coupled to the case 200 such that a part of the nozzle 300 is located inside the case 200 and the other part of the nozzle 300 is located outside the wearable device 100. The other part of the nozzle 300 may be inserted into the user's external auditory meatus when the wearable device 100 is worn on the user. According to an embodiment, the nozzle 300 may be rotatably coupled to the case 200. For example, the nozzle 300 may be coupled to the case 200 to be rotatable along the periphery of the through hole 213. According to an embodiment, at least a portion of the cross section of the nozzle 300 may have a shape corresponding to the cross section of the through hole 213. For example, the cross section of the through-hole 213 may be circular, and the cross section of a part of the nozzle 300 in contact with the through-hole 213 may be circular. Since the cross section of the nozzle 300 and the cross section of the through hole 213 have a shape corresponding to each other, the nozzle 300 may have a coaxial axis with the through hole 213 and rotate based on the through hole 213.

According to an embodiment, the nozzle 300 may include a tube 320 and a fastening portion 330. The audio path 310 formed by the tube 320 may transmit sound or signal output from the speaker 230 to the outside of the wearable device 100. For example, the audio path 310 may extend from the inner space 201 toward the outside of the wearable device 100. Audio output from the speaker 230 may pass through the audio path 310 of the nozzle 300 in the inner space 201 and may be transmitted to the outside of the wearable device 100.

According to an embodiment, the nozzle 300 may be formed of a plurality of pieces. For example, the nozzle 300 may be formed of two pieces coupled to each other. The two pieces coupled to each other may form a tube 320 and a fastening portion 330, respectively.

The tube 320 may be an acoustic transmission duct that transmits sound or signal output from the speaker 230 to the outside or transmits sound or signal introduced from the outside to the microphone 240. At least a portion of the tube 320 may be exposed to the outside of the first case 210.

The fastening portion 330 may be configured to couple the ear tip 400 and the nozzle 300. According to an embodiment, the fastening portion 330 may be a protrusion to which the ear tip 400 is fastened and may have a shape corresponding to a fastening groove (not illustrated) formed inside the ear tip 400. According to an embodiment, the fastening portion 330 may be coupled to one end of the tube 320 exposed to the outside of the first case 210.

According to an embodiment, the thickness of the fastening portion 330 may be 0.5 mm or less. For example, when the nozzle 300 is formed through insert injection, the thickness of the fastening portion 330 may be 0.05 mm to 1 mm. When the thickness of the fastening portion 330 decreases, the size of the wearable device 100 may decrease.

According to an embodiment, the fastening portion 330 and the first case 210 may be disposed to be spaced apart from each other. The separation distance r, which is a distance between the fastening portion 330 and the first case 210, may affect the performance of the microphone 240. For example, as the separation distance r decreases, the performance of the microphone 240 may be improved. When the first case 210 and the nozzle 300 are integrally manufactured, the separation distance r may unnecessarily increase. For example, when the first case 210 including the nozzle 300 is integrally formed, the separation distance r may increase by the minimum thickness capable of forming the mold. When the separation distance r increases, the length of the audio path 310 extending from the microphone 240 along the tube 320 may increase, so that the performance of the microphone 240 may be deteriorated, and the wearing comfort may be reduced. According to an embodiment, the first case 210 and the nozzle 300 of the wearable device 100 may be separately manufactured to prevent and/or reduce unnecessary increase in the separation distance r. For example, the first case 210 and the nozzle 300 may be separately manufactured. When the nozzle 300 is manufactured by inserting the tube 320 inside the first case 210, the separation distance r may be set to secure the performance of the microphone 240. Since the separation distance r is prevented/reduced from increasing, the wearable device 100 may secure excellent performance of the microphone 240.

The ear tip 400 may be coupled to a part of the nozzle 300 exposed to the outside of the case 200. When the wearable device 100 is worn to the user, the ear tip 400 may be in close contact with the inner wall of the external auditory meatus so that the audio output by the speaker 230 is smoothly transmitted to the user. In an embodiment, the ear tip 400 may be formed of a silicon material. For example, at least one area of the ear tip 400 may be deformed according to the shape of the user's ear when the wearable device 100 is worn on the user. For example, the ear tip 400 may be formed of a combination of at least one of silicon, foam, and plastic.

According to an embodiment, the wearable device 100 may improve a user's wearing comfort by including a nozzle 300 rotatably coupled to the first case 210 so as to be suitably worn on the user's ear. For example, when the nozzle 300 is coupled to the case 200 so as not to be movable, since the shape of the ear is different for each user, the user may not be able to adjust the nozzle 300 to suit his or her ear. According to an embodiment, when the nozzle 300 is rotatably coupled to the case 200, the wearable device 100 may improve a user's wearing comfort by adjusting the nozzle 300.

Figure 2A:
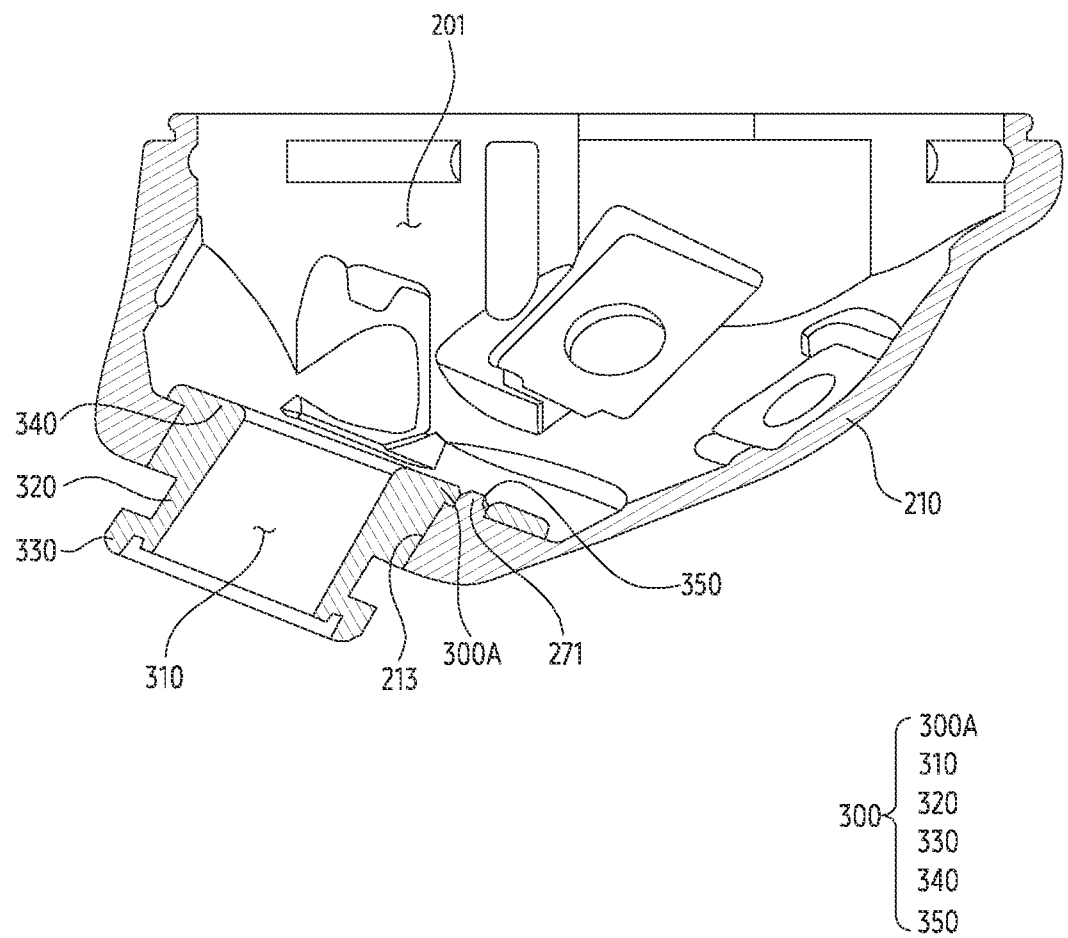
FIG. 2A is a cross-sectional view taken along A-A' of FIG. 1B while the first case and the nozzle of the wearable device are fastened, according to an embodiment.
Figure 2B:
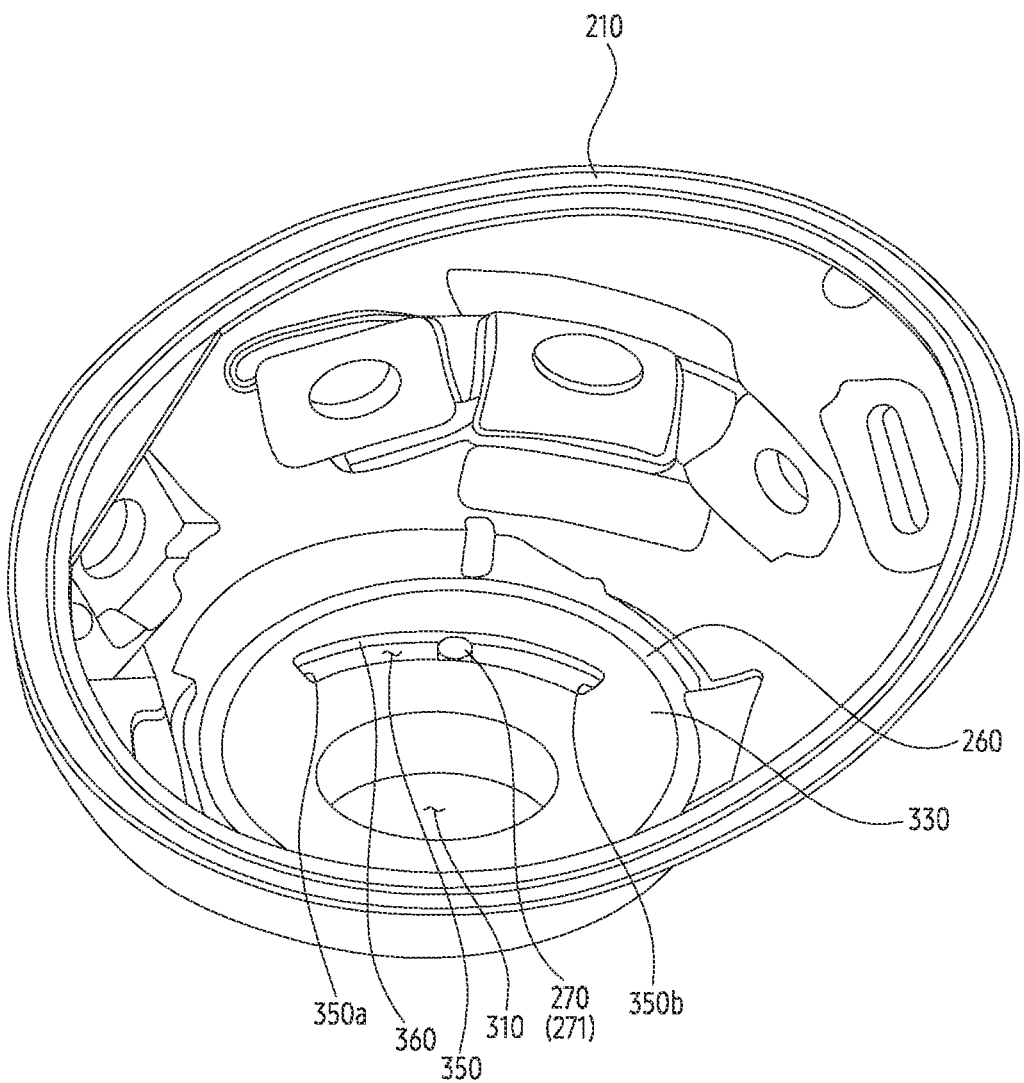
FIG. 2B is a top perspective view of a wearable device in a state in which a first case and a nozzle are fastened, according to an embodiment.

FIG. 2A is a cross-sectional view illustrating an example taken along line A-A' of FIG. 1B in a state in which the first case and the nozzle of the wearable device are fastened, and FIG. 2B is a top view illustrating a state in which a first case and a nozzle of a wearable device are fastened.

Referring to FIGS. 2A and 2B, according to an embodiment, the first case 210 forming the appearance of the wearable device 100 (e.g., the wearable device 100 of FIG. 1A) may be rotatably coupled to the nozzle 300. For example, the nozzle 300 may be inserted into the through hole 213 and coupled to the first case 210 so that a part 300A of the nozzle 300 is located in the inner space 201.

According to an embodiment, a part 300A of the nozzle 300 positioned in the first case 210 may have a shape of a flange 340. The flange 340 may be disposed on the seating portion 260 and supported by the seating portion 260. For example, the flange 340 may be formed to extend from the end of the nozzle 300 in the radial direction of the through hole 213. When assembling the wearable device 100, the nozzle 300 may be assembled to protrude from the inner space 201 to the outside of the first case 210 through the through hole 213 of the first case 210. When the nozzle 300 is assembled to protrude from the inner space 201 to the outside of the first case 210, the flange 340 may determine an external protruding length of the nozzle 300 and prevent/inhibit the nozzle 300 from being separated from the outside of the first case 210.

According to an embodiment, the size of the flange 340 may be larger than the size of the through hole 213 so that the nozzle 300 is not separated from the first case 210. For example, the outer diameter of the flange 340 may be equal to or larger than the inner diameter of the through hole 213. The outer diameter of the tube 320 may be smaller than the inner diameter of the through hole 213 in consideration of an error such as a manufacturing tolerance. The outer diameter of the flange 340 may be larger than an inner diameter of the through hole 213. Since the outer diameter of the flange 340 is manufactured to be larger than the inner diameter of the through hole 213, the flange 340 may be seated on the seating surface of the seating portion 260. The nozzle 300 inserted into the through hole 213 may rotate along the periphery of the through hole 213. For example, the nozzle 300 may rotate clockwise or counterclockwise with respect to the first case 210 along the periphery of the through hole 213. The cross section of the through hole 213 may be formed in a circular shape, and the cross section of the nozzle 300 may be manufactured in a circular shape to move along the through hole 213.

According to an embodiment, the first case 210 may include a seating portion 260 and a guiding portion 270. The seating portion 260 may support the flange 340 of the nozzle 300 positioned within the first case 210. According to an embodiment, the seating portion 260 may be a part of the first case 210 formed along the periphery of the through hole 213. For example, the seating portion 260 may have a seating surface extending from a periphery of the through hole 213 in a radial direction of the through hole 213.

The guiding portion 270 may be disposed on the seating portion 260 and guide the rotation of the nozzle 300. According to an embodiment, the guiding portion 270 may include a guiding protrusion 271 protruding from a seating surface of the seating portion 260 in contact with the flange 340 of the nozzle 300.

According to an embodiment, the nozzle 300 may include a guiding groove 350. The guiding groove 350 may accommodate the guiding protrusion 271 and guide rotation of the nozzle 300. In an embodiment, the guiding groove 350 may be formed in the flange 340 of the nozzle 300 located in the first case 210. For example, the guiding groove 350 may be an empty space formed in the flange 340 surrounded by the sidewall 360. As the guiding groove 350 is formed in the flange 340, the guiding groove 350 may rotate together with the nozzle 300. As the guiding groove 350 rotates together with the nozzle 300, the position of the guiding protrusion 271 in the guiding groove 350 may be changed. According to an embodiment, the guiding groove 350 may form a coaxial with the through hole 213 so that the nozzle 300 rotates with respect to the axis of the through hole 213. For example, the rotation center of the guiding groove 350 may be the rotation center of the nozzle 300. The rotation axis of the nozzle 300 may pass through the center of a circle that is a cross section of the through hole 213. Since the rotation axis of the nozzle 300 passes through the center of a circle that is the cross-section of the through-hole 213, and the cross-section of the nozzle 300 and the through-hole 213 is circular, the nozzle 300 inserted into the through-hole 213 may rotate.

According to an embodiment, the guiding groove 350 may extend along a part of a periphery of the through hole 213. For example, the guiding groove 350 may be in the form of an arc extending between one end 350a and the other end 350b. The guiding groove 350 may extend by a distance requiring fine adjustment of the nozzle 300. According to an embodiment, both end portions 350a and 350b of the guiding groove 350 may limit the rotation angle of the nozzle 300. For example, when the nozzle 300 rotates clockwise, the guiding groove 350 may change the position of the guiding protrusion 271 in a direction toward one end 350a of the guiding groove 350. When the guiding protrusion 271 is in contact with one end 350a of the guiding groove 350, one end 350a of the guiding groove 350 may function as a stopper for preventing/reducing rotation of the nozzle 300 rotating in the clockwise direction. For another example, when the nozzle 300 rotates counterclockwise, the guiding groove 350 may change the position of the guiding protrusion 271 in a direction toward the other end 350b of the guiding groove 350. When the guiding protrusion 271 is in contact with the other end 350b, the other end 350b of the guiding groove 350 may function as a stopper for preventing and/or reducing rotation of the rotating nozzle 300.

According to the above-described embodiment, the wearable device 100 may include a nozzle 300 rotatably coupled to the first case 210 to be suitably worn on the user's ear, thereby improving the user's wearing comfort. The wearable device 100 may prevent/inhibit the nozzle 300 from spinning with out of a designated range by providing a guiding groove 350 for limiting the rotation radius of the nozzle 300.

Figure 3:
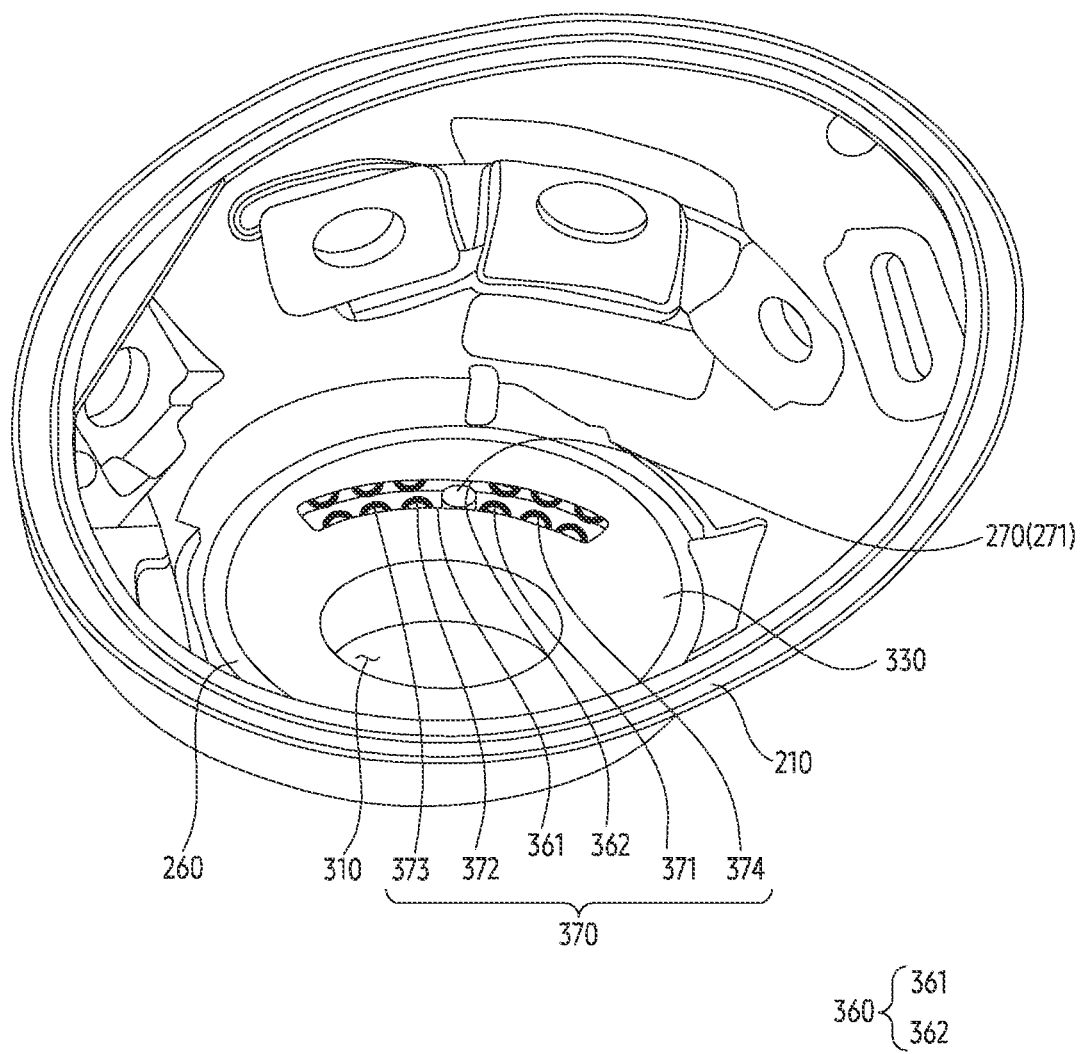
FIG. 3 is a diagram illustrating an example of a nozzle including a positioning protrusion according to an embodiment.

FIG. 3 is a diagram illustrating an example of a nozzle including a positioning protrusion according to an embodiment. The first case 210 and the nozzle 300 of FIG. 3 may be the first case 210 and the nozzle 300 in which the structures of the first case 210 and the nozzle 300 of FIGS. 1A, 1B, 2A, and/or 2B are changed, and descriptions thereof may not be repeated here.

Referring to FIG. 3, according to an embodiment, the guiding groove 350 may include a positioning protrusion 370.

The positioning protrusion 370 may interfere with rotation of the nozzle 300 to provide a click feeling to a user rotating the nozzle 300. According to an embodiment, the positioning protrusion 370 may protrude from one of a plurality of sidewalls 361 and 362 spaced apart from each other toward the other sidewall 360. For example, the positioning protrusion 370 may protrude from the first sidewall 361 adjacent to the audio path 310 toward the second sidewall 362 facing the first sidewall 361. For another example, the positioning protrusion 370 may protrude from the second sidewall 362 toward the first sidewall 361 facing the second sidewall 362.

According to an embodiment, the positioning protrusion 370 may include a plurality of positioning protrusions 371, 372, 373, and 374. For example, a plurality of positioning protrusions 371, 372, 373, and 374 may be disposed to be spaced apart from each other along the first sidewall 361. The guiding protrusion 271 may be located in one space among the spaces between a plurality of positioning protrusions 371, 372, 373, and 374.

According to an embodiment, a plurality of positioning protrusions 371, 372, 373, and 374 may move the guiding protrusion 271 positioned in one space among the spaces between the plurality of positioning protrusions 371, 372, 373, and 374 to the another space between the plurality of positioning protrusions 371, 372, 373, and 374 by the rotation of the nozzle 300. For example, when the nozzle 300 rotates clockwise, the position of the guiding protrusion 271 may be changed from a space between the first positioning protrusion 371 and the second positioning protrusion 372 to a space between the second positioning protrusion 372 and the third positioning protrusion 373. For another example, when the nozzle 300 rotates counterclockwise, the position of the guiding protrusion 271 may be changed from a space between the first positioning protrusion 371 and the second positioning protrusion 372 to a space between the first positioning protrusion 371 and the fourth positioning protrusion 374.

According to an embodiment, the protrusion formed on the first sidewall 361 and the protrusion formed on the second sidewall 362 may be disposed on the first sidewall 361 and the second sidewall 362, respectively, to face each other. A space in which the guiding protrusion 271 can move may be formed between the protrusion formed on the first sidewall 361 and the protrusion formed on the second sidewall 362 disposed to face each other.

According to an embodiment, although the positioning protrusion 370 has been described as a plurality of positioning protrusions 371, 372, 373 and 374, there may be only one positioning protrusion 370. For example, the positioning protrusion 370 may be disposed inside the guiding groove 350 and may be move the guiding protrusion 271 in a space positioned on one side surface of the positioning protrusion 370 or a space positioned on the other side surface opposite to one side surface of the positioning protrusion 370. The guiding protrusion 271 may flow finely in a space located on one side surface of the positioning protrusion 370 or a space located on the other side surface of the positioning protrusion 370.

According to an embodiment, the positioning protrusion 370 has been described as positioned on both the first sidewall 361 and the second sidewall 362 and described as being disposed in a shape corresponding to each other but is not limited thereto. For example, the positioning protrusion 370 may be disposed on one of the first sidewall 361 or the second sidewall 362. For another example, a part of the positioning protrusions may be disposed on a part of the first side wall 361, and the other part of the positioning protrusions may be disposed on the second side wall 362 facing the other part of the first side wall 361.

According to an embodiment, the positioning protrusion 370 may be made of an elastically deformable material. For example, the positioning protrusion 370 may be made of at least one material selected from rubber, polyurethane, or a combination thereof.

According to the above-described embodiment, the wearable device 100 may provide a click feeling to a user rotating the nozzle 300 by including a positioning protrusion 370 that may interfere with rotation of the nozzle 300. The user may intuitively grasp the degree of rotation of the nozzle 300 by the click feeling provided by the positioning protrusion 370. The wearable device 100 may fix the nozzle 300 at a designated position in the guiding groove 350 to maintain the position of the nozzle 300 while the user is wearing the wearable device 100. By preventing and/or reducing the nozzle 300 from moving and maintaining the position of the nozzle 300 fitted to the user, the wearable device 100 may provide a position of the nozzle 300 suitable for the shape of the user's ear and may improve the user's wearing comfort when the wearable device 100 is worn.

Figure 4:
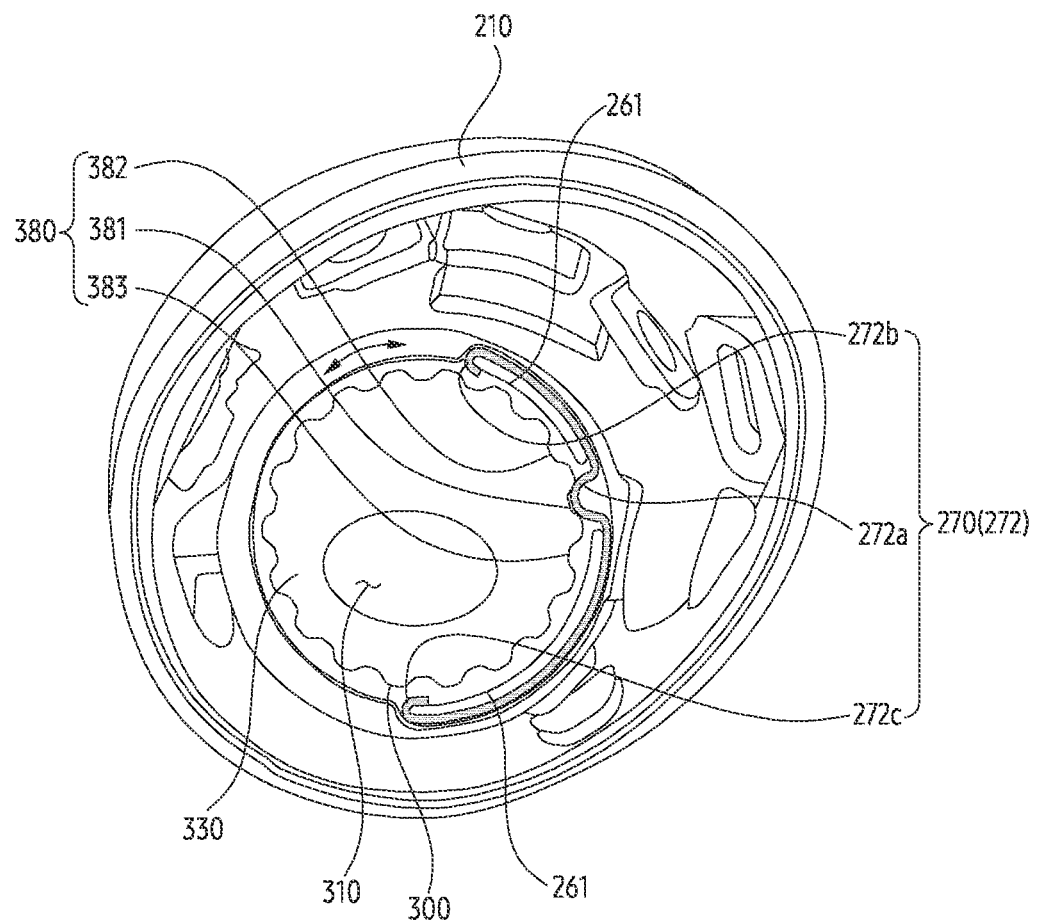
FIG. 4 is a diagram illustrating an example of a nozzle including a fixing groove according to an embodiment.

FIG. 4 is a diagram illustrating an example of a nozzle including a fixing groove according to an embodiment. The first case 210 and the nozzle 300 of FIG. 4 may be the first case 210 and the nozzle 300 in which the structures of the first case 210 and the nozzle 300 of FIGS. 1A, 1B, 2A, and/or 2B are changed, and thus repeated descriptions may not be provided here.

Referring to FIG. 4, according to an embodiment, the nozzle 300 may include a fixing groove 380. The fixing groove 380 may be disposed along a periphery of a part 300A of the nozzle 300. According to an embodiment, the fixing groove 380 may be disposed along the periphery of the flange 340. According to an embodiment, the fixing grooves 380 may be plural. The flange 340 may have a shape including a plurality of irregularities by forming a plurality of fixing grooves 381, 382, and 383 at peripheries. A plurality of fixing grooves 381, 382, and 383 may rotate together with the nozzle 300.

According to an embodiment, the guiding portion 270 may be an elastic plate 272. The elastic plate 272 is disposed on the seating portion 260 and may provide an elastic force to the nozzle 300 to provide a click feeling to a user rotating the nozzle 300.

According to an embodiment, the elastic plate 272 may extend along at least a portion of a periphery of the seating portion 260. According to an embodiment, the elastic plate 272 may include a fixing protrusion 272a protruding toward the nozzle 300. The fixing protrusion 272a may be seated in a plurality of fixing grooves 381, 382, and 383. The fixing protrusion 272a may be deformed by a part 300A of the nozzle 300 as the nozzle 300 rotates and may interfere with the rotation of the nozzle 300. For example, the elastic plate 272 may be a leaf spring, but is not limited thereto, and may be one of various elastic bodies according to Hooke's law.

According to an embodiment, the seating portion 260 may include a fixing portion 261. The fixing portion 261 may fix the elastic plate 272 on the seating portion 260. For example, the elastic plate 272 may be fixed on the seating portion 260 by arranging both ends 272b and 272c to be caught by each of the plurality of fixing portions 261.

According to an embodiment, a plurality of fixing grooves 381, 382, and 383 may move the fixing protrusion 272a positioned in the fixing groove 380 among the plurality of fixing grooves 381, 382, and 383, to another fixing groove 380 among the plurality of fixing grooves 381, 382, and 383 by the rotation of the nozzle 300. For example, when the nozzle 300 rotates clockwise, a plurality of fixing grooves 381, 382, and 383 may position the fixing protrusion 272a positioned in the first fixing groove 381 in the second fixing groove 382. As another example, a plurality of fixing grooves 381, 382, and 383 may position the fixing protrusion 272a positioned in the first fixing groove 381 in the third fixing groove 383 when the nozzle 300 rotates counterclockwise.

According to the above-described embodiment, the wearable device 100 may comprise an elastic plate 272 that may interfere with rotation of the nozzle 300, thereby providing a click feeling to a user rotating the nozzle 300. The user may intuitively grasp the degree of rotation of the nozzle 300 by the click feeling provided by the elastic plate 272. The wearable device 100 may be configured to allow the nozzle 300 to rotate 360 degrees, and the position of the nozzle 300 may be finely adjusted. Although the user's wearing comfort varies depending on the shape of the ear tip 400 or the shape of the nozzle 300, the wearable device 100 may provide a comfortable wearing comfort to the user even when inserted into a different ear canal for each user with 360 degrees rotatable structure.

Figure 5A:
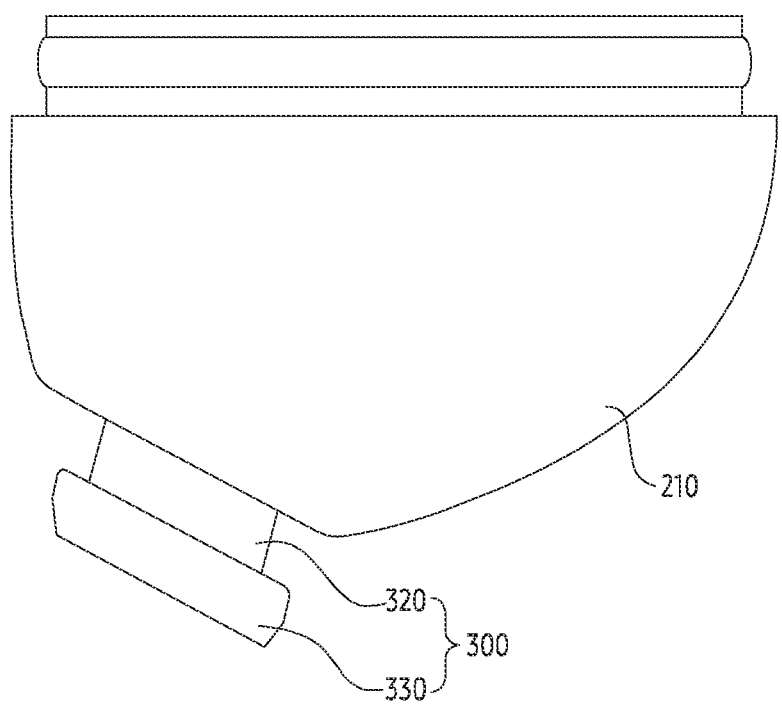
FIG. 5A is a diagram illustrating an example of a structure in which a first case and a nozzle are coupled, according to an embodiment.
Figure 5B:
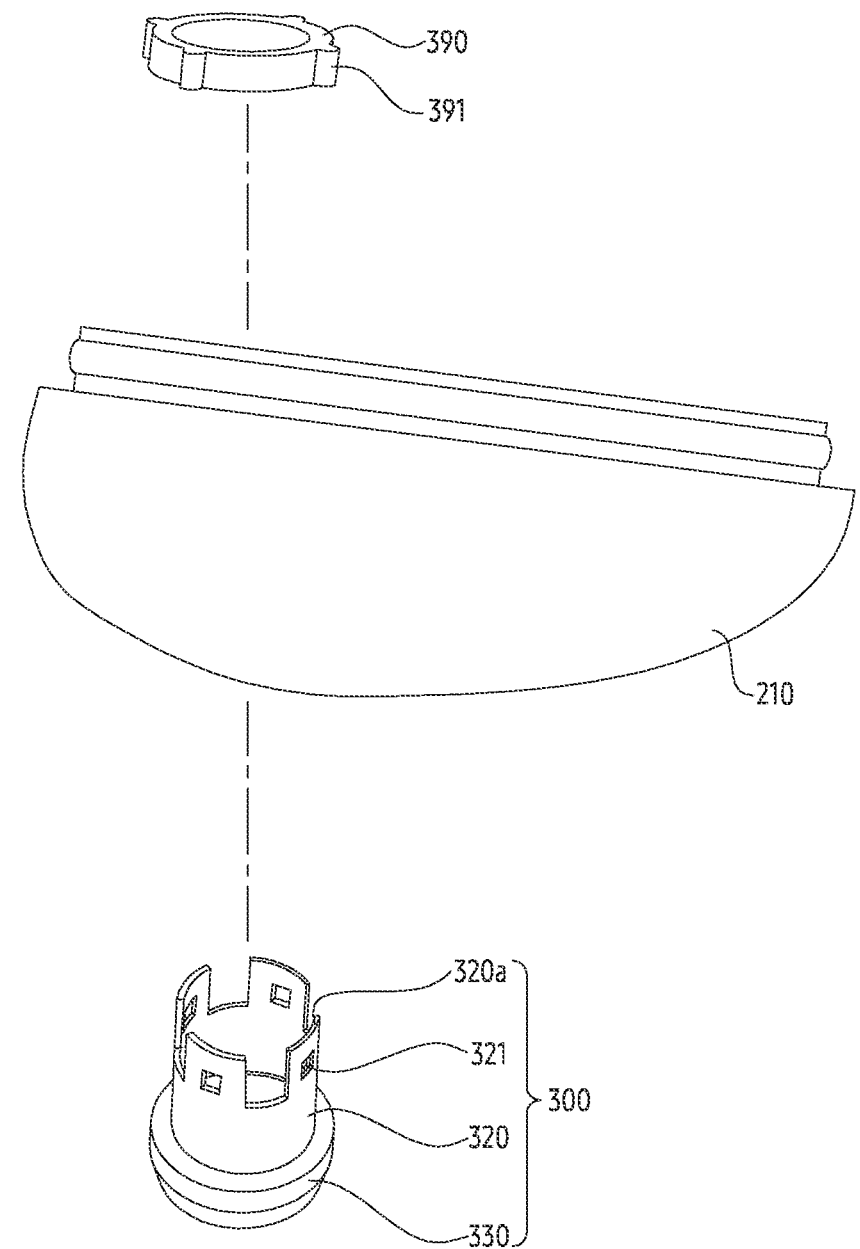
FIG. 5B is an exploded perspective view of the first case and nozzle illustrated in FIG. 5A.

FIG. 5A is a diagram illustrating an example of a structure in which a first case and a nozzle are coupled according to an embodiment and FIG. 5B is an exploded perspective view of the first case and nozzle illustrated in FIG. 5A.

The first case 210 and the nozzle 300 of FIGS. 5A and 5B may be the first case 210 and the nozzle 300 in which the structures of the first case 210 and the nozzle 300 of FIGS. 1A, 1B, 2A, and/or 2B are changed, and thus repeated descriptions may not be provided here.

Referring to FIGS. 5A and 5B, according to an embodiment, the nozzle 300 may be rotatably coupled to the first case 210 and may include a holder 390.

According to an embodiment, the tube 320 may be coupled to the first case 210 so that one end 320a is inserted into the first case 210 and may move finely from the inside of the first case 210. According to an embodiment, the tube 320 may include an opening 321 formed on a side surface. For example, the opening 321 may be formed on a side surface of one end 320a of the tube 320 including the nozzle 300. A plurality of openings 321 may be formed. The opening 321 may include a plurality of openings 321. A plurality of openings 321 may be spaced apart from the fastening portion 330 by the same distance, and each of the plurality of openings 321 may be disposed along the outer surface of the tube 320.

The holder 390 may support the nozzle 300 so that the first case 210 and the nozzle 300 are maintained in a coupled state. According to an embodiment, the holder 390 may include a protrusion portion 391 extending in a radial direction of the nozzle 300. For example, the protrusion portion 391 may be formed by extend from the periphery of the holder 390 in the radial direction of the nozzle 300. The nozzle 300 may be coupled to the first case 210 by inserting the protrusion portion 391 into the opening 321 after one end 320a of the tube 320 is inserted into the first case 210.

According to an embodiment, a plurality of protrusions 391 may be formed. A plurality of protrusions may be spaced apart from each other, disposed along the outer surface of the holder 390, and inserted into each of the plurality of openings. For example, a plurality of protrusions may be spaced apart from each other at equal intervals and disposed along the outer surface of the holder 390.

Figure 6A:
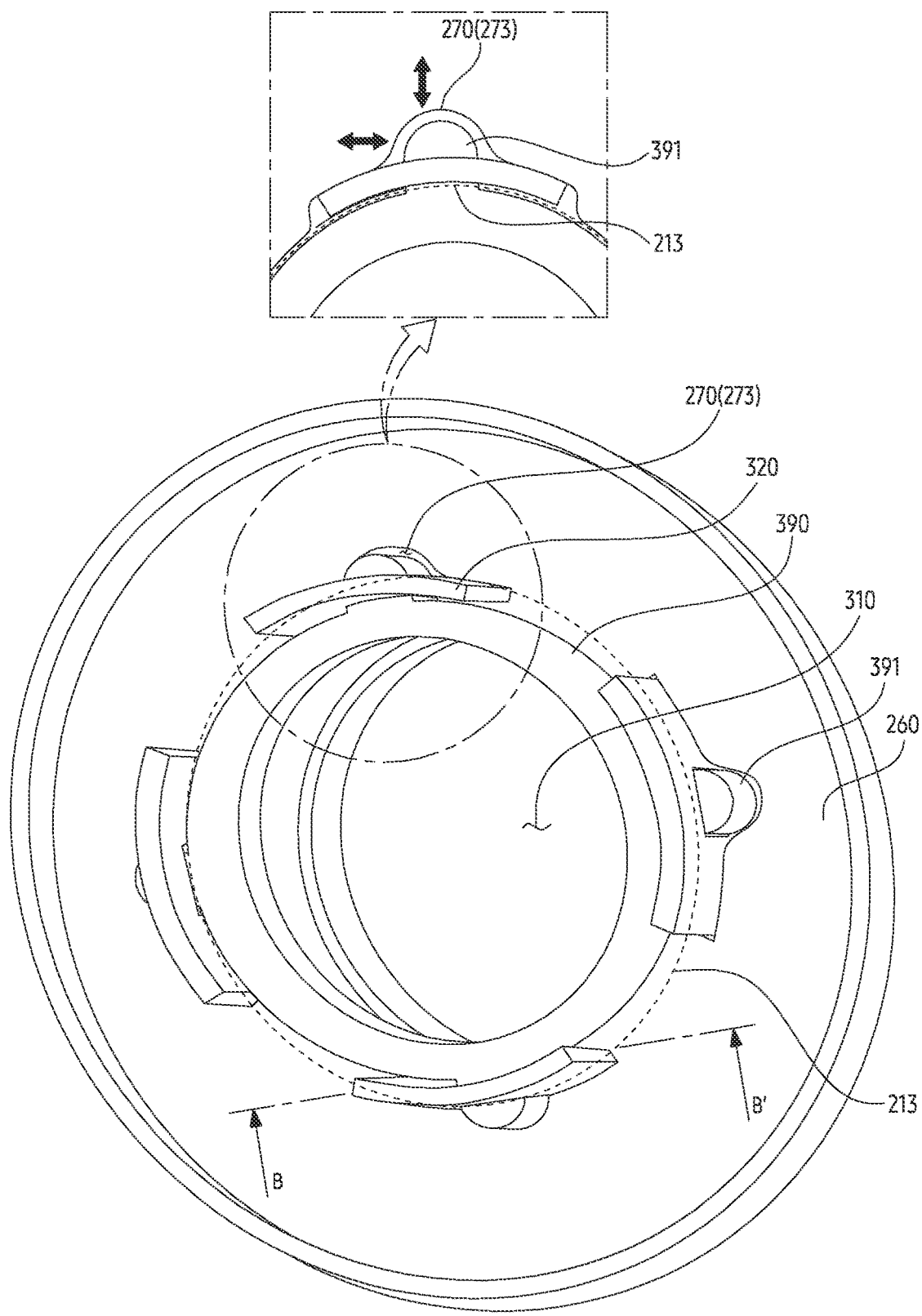
FIG. 6A is a perspective view illustrating an example of a structure in which a first case and a nozzle are coupled, according to an embodiment.
Figure 6B:
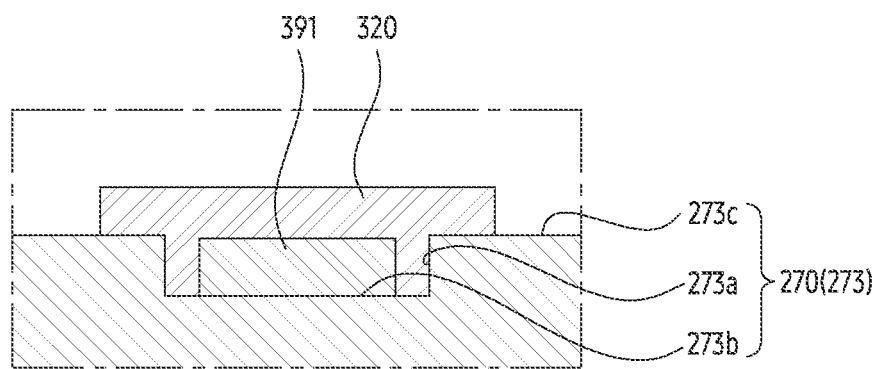
FIG. 6B is a cross-sectional view illustrating an example in which a structure in which a first case and a nozzle are coupled taken along B-B' of FIG. 6A, according to an embodiment.

FIG. 6A is a diagram illustrating an example of a structure in which a first case and a nozzle are coupled to each other according to various embodiments, and FIG. 6B is a cross-sectional view illustrating an example in which the structure in which the first case and the nozzle are coupled taken along B-B' of FIG. 6A according to various embodiments.

Referring to FIGS. 6A and 6B, according to an embodiment, the tube 320 may be inserted into the through hole 213 of the first case 210. The protrusion portion 391 of the holder 390 may be inserted into the opening 321 of the tube 320 and positioned on the seating portion 260 to support the nozzle 300.

The guiding portion 270 may refer to a stopping groove 273. The stopping groove 273 may accommodate a portion of the protrusion portion 391 and limit a movement range of the protrusion portion 391. A portion of the protrusion portion 391 may move in the stopping groove 273 according to the rotation of the nozzle 300. For example, as the nozzle 300 rotates, the protrusion portion 391 may move inside the stopping groove 273. According to an embodiment, the stopping groove 273 may be formed on the seating portion 260. For example, the stopping groove 273 may be formed from a portion of a periphery of the through hole 213 in a radial direction of the through hole 213.

According to an embodiment, the stopping groove 273 may be formed by the step portion 273a of the seating portion 260. The step portion 273a may be disposed between a first surface 273b of the seating portion 260 in contact with the protruding portion 391 and a second surface 273c distinguished from the first surface 273b. For example, the second surface 273c may be one surface of the seating portion 260 spaced apart from the first surface 273b in the extending direction of the audio path 310.

According to an embodiment, when the user moves the nozzle 300, the tube 320 and the holder 390 may move together. When the nozzle 300 moves, the protrusion portion 391 may move together with the nozzle 300 inside the stopping groove 273. When the protrusion portion 391 moving together with the nozzle 300 contacts with the step portion 273a, movement of the protrusion portion 391 may be restricted and movement of the nozzle 300 may be restricted. For example, the protrusion portion 391 may move in the left and right directions in FIG. 6A. When the protrusion portion 391 moving in the left-right direction contacts with the step portion 273a, movement of the protrusion may be restricted. For another example, the protrusion portion 391 may move in the upward direction in FIG. 6A. When the protrusion portion 391 moving upward contacts with the step portion 273a, movement of the protrusion portion 391 may be restricted. As another example, the protrusion portion 391 may move in a downward direction in FIG. 6A. Movement of the protrusion portion 391 moving downward may be limited when another protrusion portion 391 moving inside the other stopping groove facing stopping groove 273 where the protrusion portion 391 is located contacts with the other step portion.

According to the above-described embodiment, the wearable device (e.g., the wearable device 100 of FIGS. 1A and/or 1B) may include a nozzle 300 movable inside the stopping groove 273 so as to be suitably worn on the user's ear, thereby improving the user's wearing comfort.

Figure 7A:
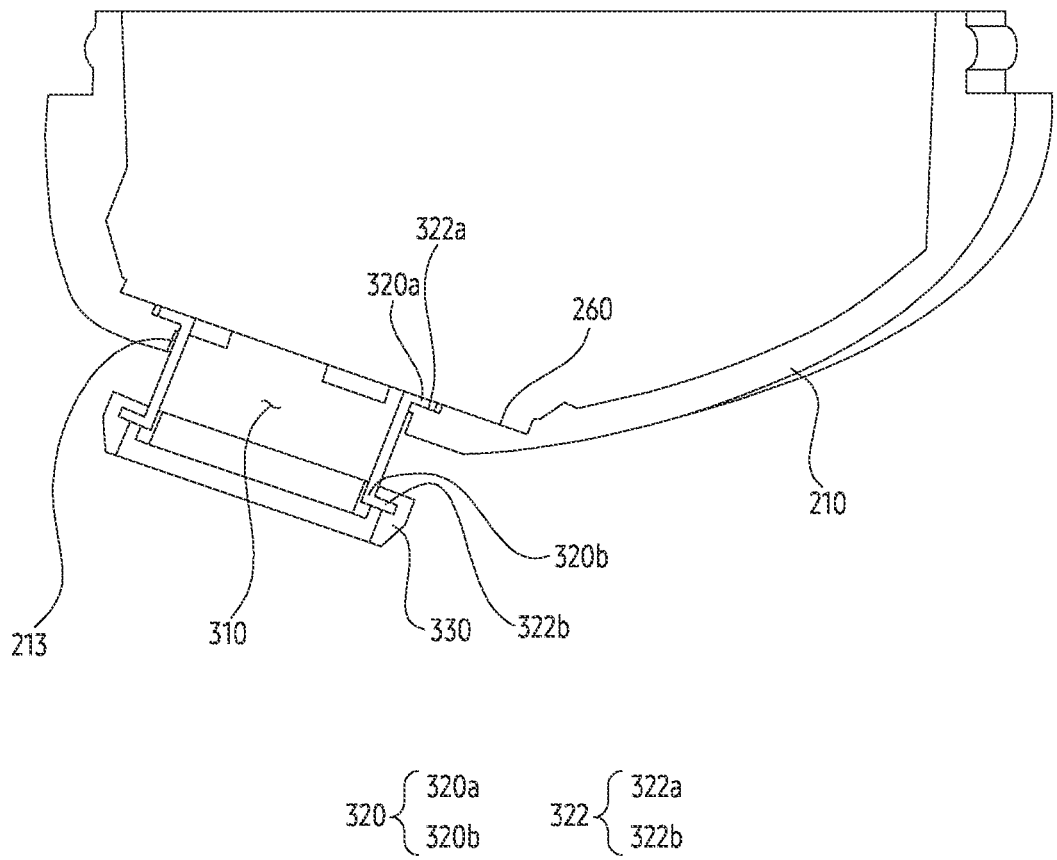
FIG. 7A is a cross-sectional view of a first case and a nozzle according to an embodiment.
Figure 7B:
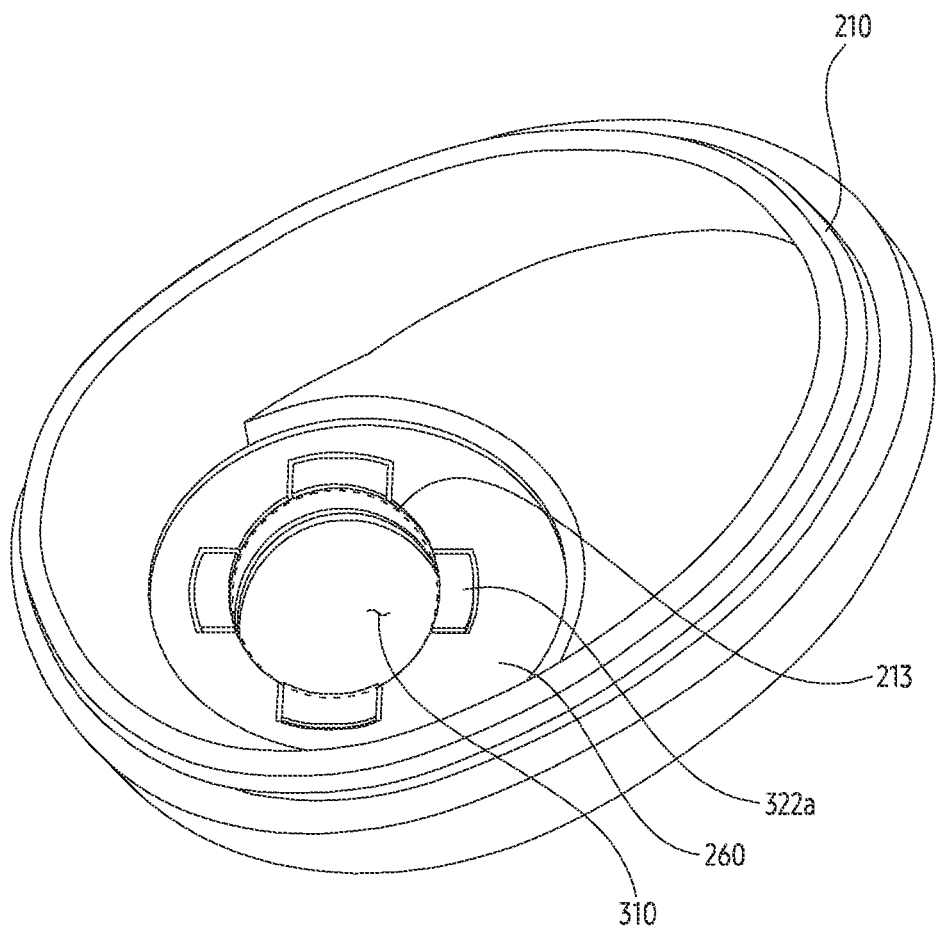
FIG. 7B is a diagram illustrating a combined structure of the first case and the nozzle of FIG. 7A as viewed from above.

FIG. 7A is a cross-sectional view of a first case and a nozzle according to an embodiment, and FIG. 7B is a diagram illustrating a combined structure of the first case and the nozzle of FIG. 7A, as viewed from the top.

The first case 210 and the nozzle 300 of FIGS. 7A and 7B may be a first case 210 and a nozzle 300 in which a coupling method of the first case 210 and the nozzle 300 of FIGS. 6A and/or 6B is changed, and thus repeated description may not be provided here.

Referring to FIGS. 7A and 7B, according to an embodiment, the tube 320 of the nozzle 300 may pass through the through hole 213 and may be inserted into the first case 210. According to an embodiment, the tube 320 may be coupled to the first case 210 such that one end 320a is disposed inside the first case 210 and the other end 320b is exposed to the outside of the first case 210.

According to an embodiment, the nozzle 300 may include a bending portion 322. The bending portion 322 may be formed by bending at least a portion of both ends 320a and 320b of the tube 320. According to an embodiment, the bending portion 322 may include a first bending portion 322a and a second bending portion 322b. The first bending portion 322a may be formed by bending a part of one end 320a of the tube 320 inserted into the first case 210 along a radial direction of the audio path 310. The second bending portion 322b may be formed by bending a part of the other end 320b of the tube 320 exposed to the outside of the first case 210 to the radius of the audio path 310.

According to an embodiment, the tube 320 may be coupled to the first case 210 by a first bending portion 322a positioned at one end 320a of the tube 320. For example, the tube 320 may be coupled to the first case 210 as the first bending portion 322a bent along the radial direction of the audio path 310 crosses the seating portion 260 of the first case 210.

According to an embodiment, the nozzle 300 may include a fastening portion 330 coupled to the ear tip (e.g., the ear tip 400 of FIGS. 1A and/or 1B). The tube 320 may be coupled to the fastening portion 330 by a second bending portion 322b positioned at the other end 320b of the tube 320. According to an embodiment, the tube 320 and the fastening portion 330 may be coupled to each other by inserting the second bending portion 322b positioned at the other end 320b of the tube 320 into the fastening portion 330. According to an embodiment, the fastening portion 330 may form a step with the tube 320 to support the ear tip. For example, the cross-sectional area of the fastening portion 330 may be larger than the cross-sectional area of the tube 320.

The above-described method of manufacturing the wearable device 100 described in FIGS. 7A and 7B is as follows. According to an embodiment, the tube 320 may be manufactured to include an audio path 310 therein. For example, when the tube 320 is made of a metal material, the tube 320 may be pressed to form an audio path 310. A part of the other end 320B of the tube 320 may be bent in the radial direction of the audio path 310 through a pressing process to form a second bending portion 322b. The tube 320 and the fastening portion 330 may be coupled by receiving the tube 320 in which the second bending portion 322b is formed in a mold for molding the fastening portion 330 and injecting the fastening portion 330.

The manufactured tube 320 and the fastening portion 330 may be inserted into the through hole 213 of the first case 210. A part of one end 320a of the tube 320 inserted into the first case 210 may be bent in a radial direction of the audio path 310 through a pressing process to form a first bending portion 322a. The nozzle 300 may be coupled to the first case 210 when the first bending portion 322a crosses the seating portion 260 of the first case 210.

According to the above-described embodiment, the wearable device 100 may be coupled to the first case 210 by bending a part of the nozzle 300 without a separate component for coupling the first case 210 and the nozzle 300, thereby providing a simple design structure. In the process of manufacturing the nozzle 300 separately from the first case 210, the protruding length of the nozzle 300 may be more easily adjusted than the process of integrally forming the first case and the nozzle through a mold.

Figure 8A:
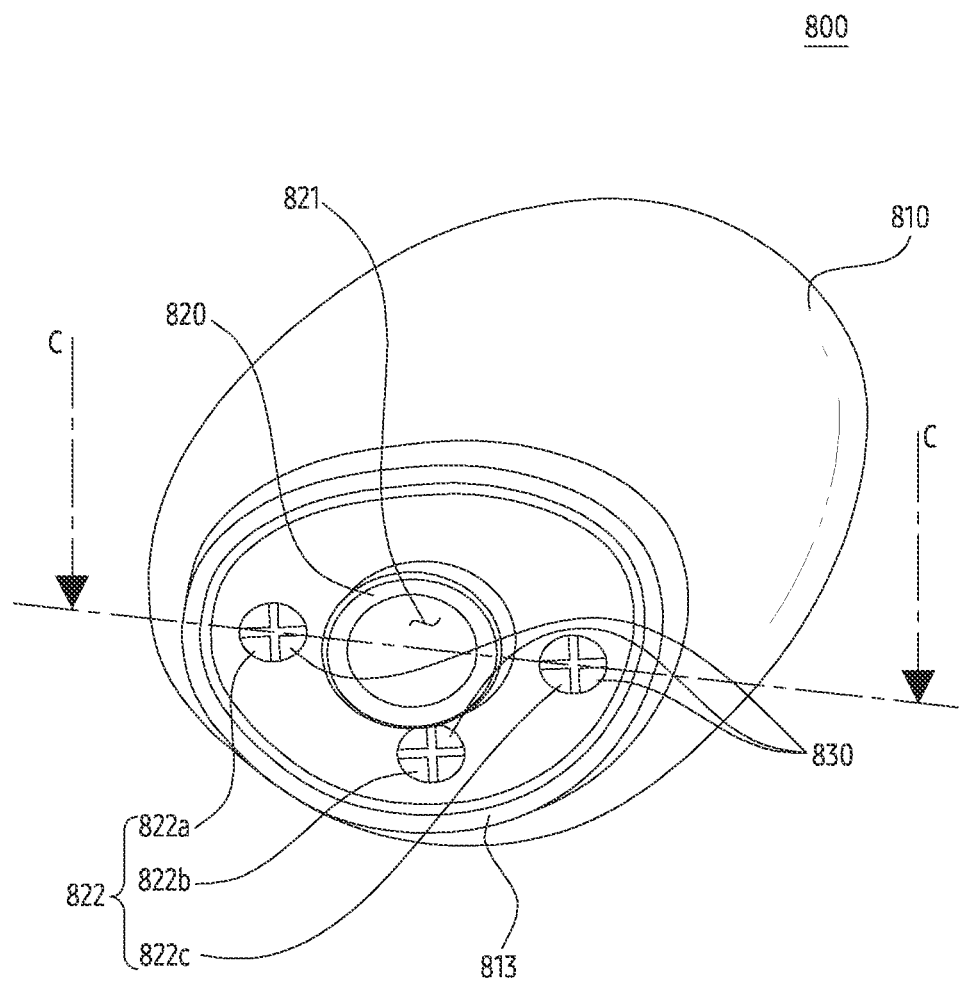
FIG. 8A is a diagram illustrating a rear view illustrating rear surfaces of a first case and a nozzle of a wearable device, according to an embodiment.
Figure 8B:
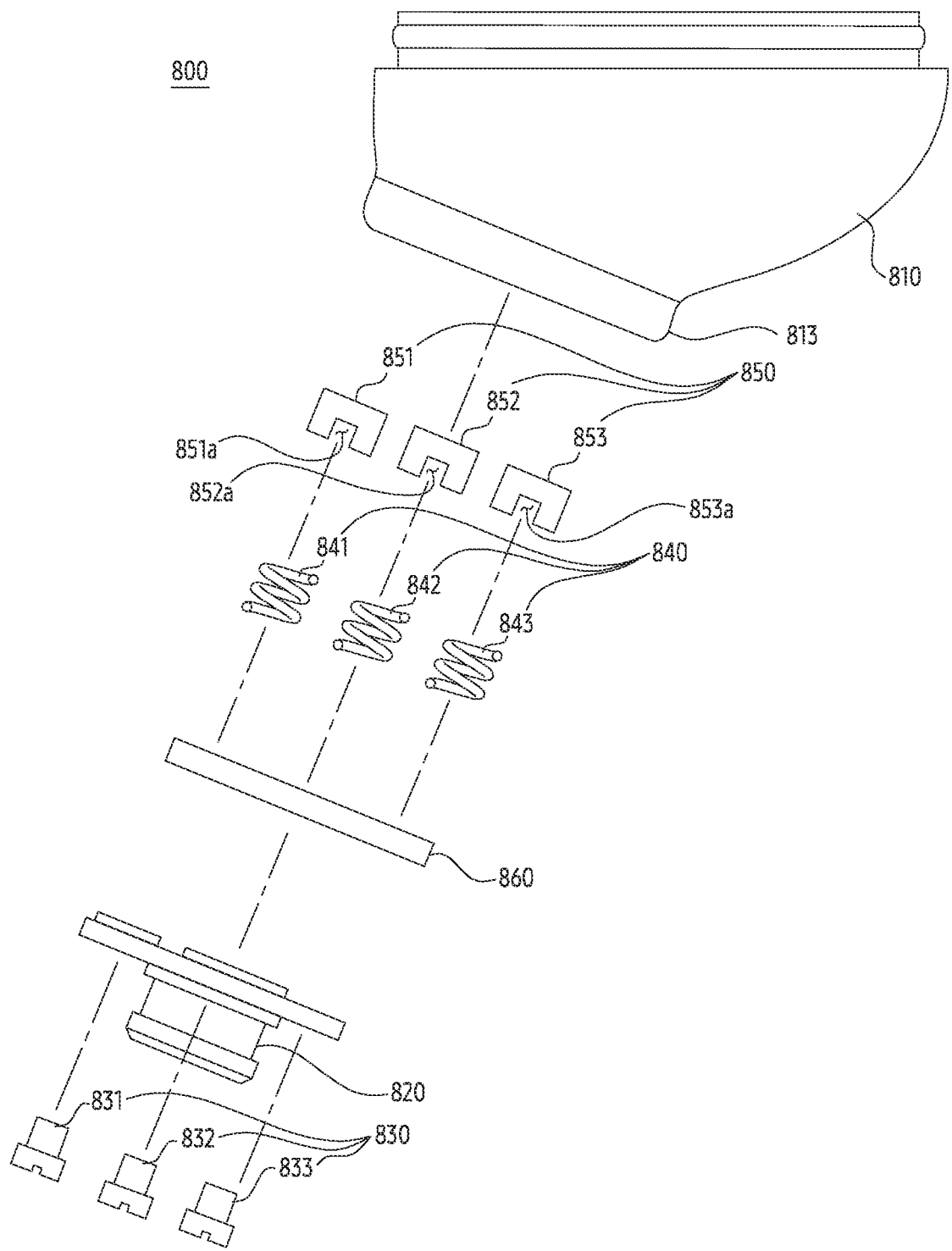
FIG. 8B is an exploded perspective view of the first case and nozzle illustrated in FIG. 8A.
Figure 9A:
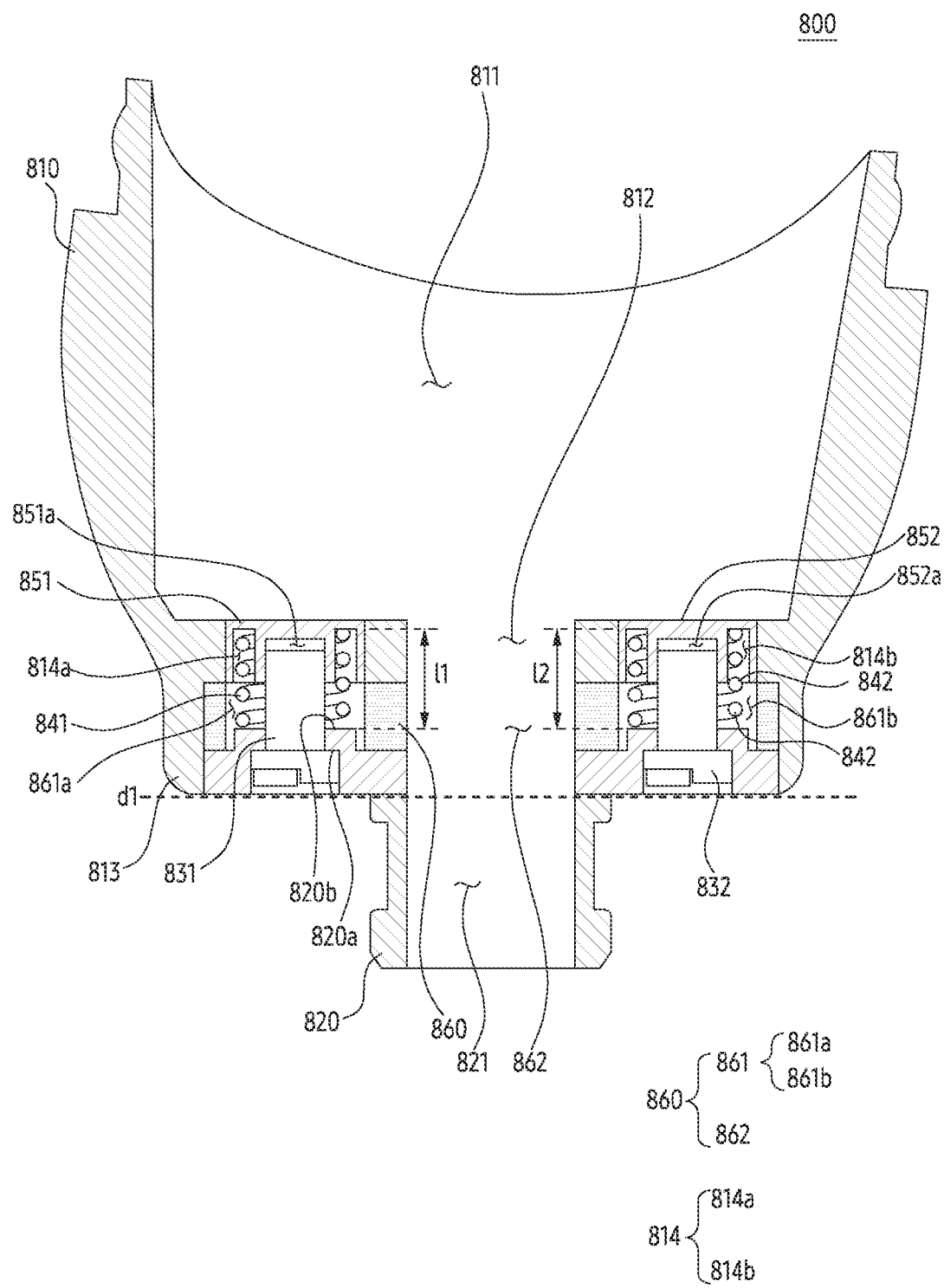
FIG. 9A is a cross-sectional view of a first case and a nozzle taken along C-C' of FIG. 8A according to an embodiment.
Figure 9B:
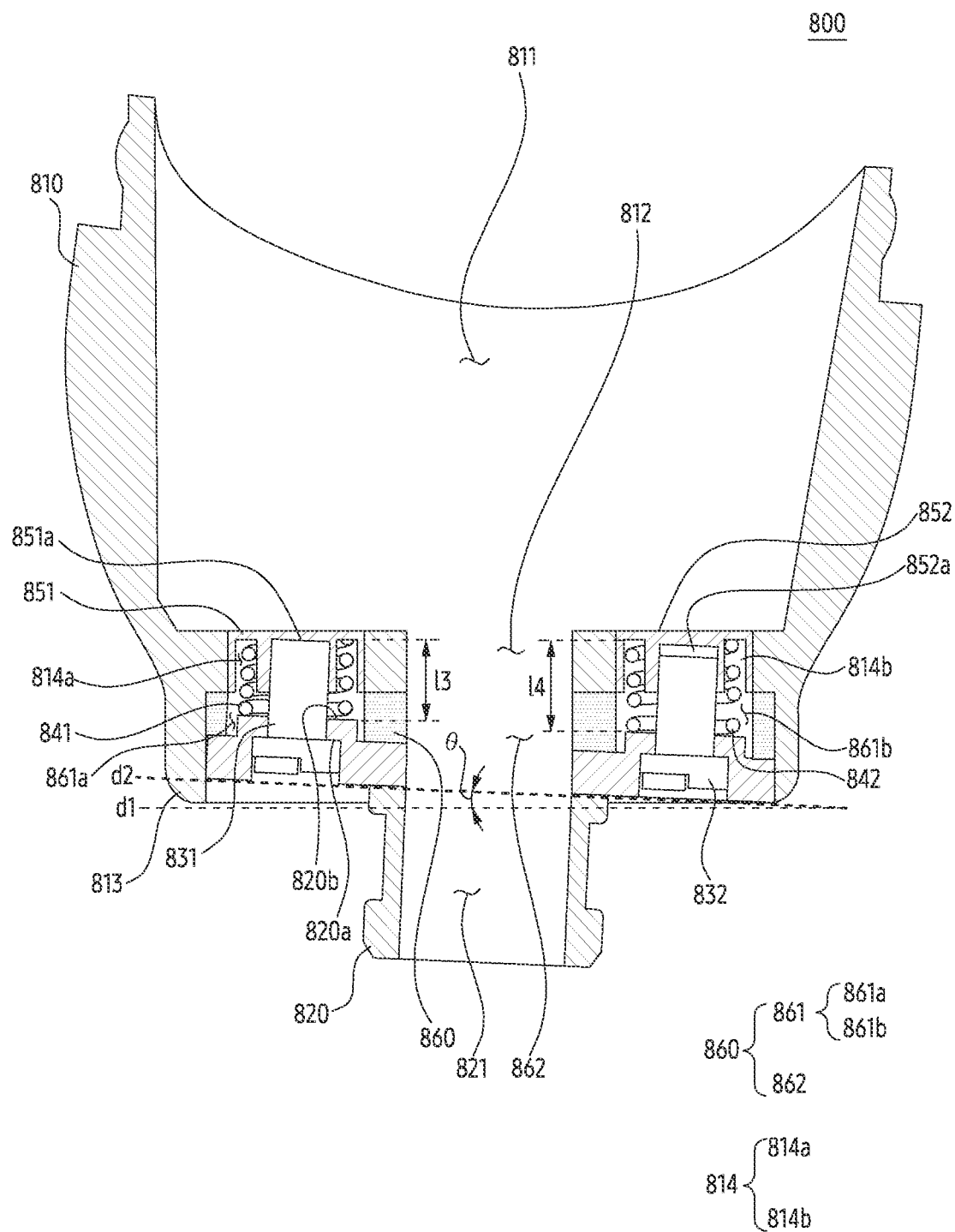
FIG. 9B is a cross-sectional view illustrating an example in which the position of the nozzle is changed by the adjustment pieces in the first case and the nozzle of FIG. 9A.

FIG. 8A is a diagram illustrating a rear view of rear surfaces of a first case and a nozzle of a wearable device, and FIG. 8B is an exploded perspective view of the first case and the nozzle illustrated in FIG. 8A. FIG. 9A is a cross-sectional view of a first case and a nozzle taken along line C-C' of FIG. 8A and FIG. 9B is a cross-sectional view illustrating an example in which the position of the nozzle is changed by the adjustment pieces in the first case and the nozzle of FIG. 9A.

Referring to FIGS. 8A, 8B, 9A, and 9B, according to an embodiment, the wearable device 800 may include a first case 810, a second case (not illustrated), a nozzle 820, an adjustment piece 830, an elastic piece 840, a fastener 850, and a deformation portion 860.

The first case 810 may form an outer surface that may be gripped by a user's hand. The outer surface of the wearable device 800 may be formed by the first case 810 and the second case. The first case 810 may be surrounded by the second case covering an open surface of the first case 810. According to an embodiment, the first case 810 and the second case may form an inner space 811. The inner space 811 may accommodate various components of the wearable device 800 inside the wearable device 800. According to an embodiment, the first case 810 may include a through hole 812 connecting the inner space 811 and the outside of the wearable device 800. The through hole 812 may transmit sound or signal output from a speaker (e.g., speaker 230 of FIG. 1B) of the inner space 811 to the outside of the first case 810.

The nozzle 820 may connect the inner space 811 of the first case 810 to the outside of the wearable device 800. According to an embodiment, the nozzle 820 may be coupled to a first region 813 which is one region of the first case 810 including the through hole 812. The first region 813 may include an empty space therein to accommodate a portion of the nozzle 820. For example, the nozzle 820 may be coupled to the first region 813 such that one side faces the outside of the wearable device 800 and the other side is located in an empty space inside the first region 813.

According to an embodiment, the nozzle 820 may include an acoustic duct 821 for transmitting sound or signal output from the speaker to the outside of the wearable device 800. The acoustic duct 821 may extend from the other side of the nozzle 820 positioned inside the first region 813 toward the outside of the wearable device 800.

The adjustment piece 830 may press one surface 820a of the nozzle 820 exposed to the outside of the wearable device 800. According to an embodiment, the adjustment piece 830 may include a plurality of adjustment pieces 831, 832, and 833.

According to an embodiment, a fastening hole 822 may be formed in the nozzle 820. The adjustment piece 830 may pass through the fastening hole 822 such that one end is located inside the first region 813. According to an embodiment, the fastening hole 822 may include a plurality of fastening hole 822a, 822b, and 822c passing through each of the plurality of adjustment pieces 831, 832, 833 respectively. For example, each of the first adjustment piece 831, the second adjustment piece 832, and the third adjustment piece 833 may penetrate each of the first fastening hole 822a, the second fastening hole 822b, and the third fastening hole 822c.

The elastic piece 840 may press the other surface 820b of the nozzle 820 facing one surface 820a of the nozzle 820. According to an embodiment, the elastic piece 840 may be disposed to surround the adjustment piece 830. According to an embodiment, the elastic piece 840 may include a plurality of elastic pieces 841, 842, and 843, corresponding to a plurality of adjustment pieces 831, 832, and 833, respectively. Each of the plurality of elastic pieces 841, 842, and 843 may be disposed to surround each of a plurality of adjustment pieces 831, 832, and 833. For example, each of the first elastic piece 841, the second elastic piece 842, and the third elastic piece 843 may be disposed to surround the first adjustment piece 831, the second adjustment piece 832, and the third adjustment piece 833, respectively.

The fastener 850 may support the adjustment piece 830. According to an embodiment, the fastener 850 may be coupled to one end of the adjustment piece 830 facing the first case 810 to support the adjustment piece 830. For example, the coupling method between the adjustment piece 830 and the fastener 850 may be a screw coupling method but is not limited thereto. According to an embodiment, the fastener 850 may be disposed in the first region 813 of the first case 810 to be adjacent to the inner space 811. For example, the fastener 850 may be disposed in the first region 813 of the first case 810 to contact the inner space 811.

According to an embodiment, the fastener 850 may include a plurality of fasteners 851, 852, and 853 corresponding to each of the plurality of adjustment pieces 831, 832, and 833. For example, each of the first fastener 851, the second fastener 852, and the third fastener 853 may be coupled to each of the first adjustment piece 831, the second adjustment piece 832, and the third adjustment piece 833, respectively.

According to an embodiment, each of the plurality of fasteners 851, 852, and 853 may include a plurality of fastening grooves 851a, 852a, and 853a so that the plurality of adjusting pieces 831, 832 and 833 may be movable inside the plurality of fasteners 851, 852, and 853, respectively. Each of a plurality of adjustment pieces 831, 832, and 833 maintains a coupling state with a plurality of fasteners 851, 852, and 853 and may move in a direction toward the inner space 811 from the inside of the plurality of fastening grooves 851a, 852a, and 853a or a direction toward the outside of the wearable device 800.

According to an embodiment, an accommodating portion 814 may be formed in the first region 813 which is one region of the first case 810. The accommodating portion 814 may accommodate the adjustment piece 830, the elastic piece 840, and the fastener 850. The accommodating portion 814 may be configured in plurality to accommodate each of the plurality of adjustment pieces 831, 832, and 833, the plurality of elastic pieces 841, 842, and 843, and the plurality of fasteners 851, 852, and 853. The number of a plurality of accommodating portions may correspond to the number of a plurality of elastic pieces 841, 842, and 843. For example, the first accommodating portion 814a may accommodate the first adjustment piece 831, the first elastic piece 841, and the first fastening piece 851 therein. As another example, the second accommodating portion 814b may accommodate the second adjustment piece 832, the second elastic piece 842, and the second fastener 852 therein.

The deformation portion 860 may elastically support the nozzle 820. According to an embodiment, the deformation portion 860 may be disposed between the first case 810 and the nozzle 820. For example, the deformation portion 860 may be disposed such that one side faces the inner space 811, and the other side thereof contacts the nozzle 820. For example, the deformation portion 860 may be at least one of a sponge and rubber but is not limited thereto and may be one of various elastic bodies according to Hooke's law.

According to an embodiment, the deformation portion 860 may include a through hole 861 connected to the fastening hole 822. The through holes 861 may be configured in plurality such that each of the plurality of adjustment pieces 831, 832, and 833 passes. The number of a plurality of through holes may correspond to the number of a plurality of adjustment pieces 831, 832, and 833. For example, each of the first adjustment piece 831 and the second adjustment piece 832 may pass through each of the first through hole 861a and the second through hole 861b.

According to an embodiment, the deformation portion 860 may include an acoustic hole 862 connecting the through hole 812 and the acoustic duct 821. Audio output from a speaker (e.g., speaker 230 of FIGS. 1A and/or 1B)

may be transmitted to the outside along an audio transmission path including the through hole 812, the acoustic hole 862, and the acoustic duct 821.

Referring to FIGS. 9A and 9B, according to an embodiment, at least one of the plurality of adjustment pieces 831 and 832 may move with respect to the first case 810 so that the length of the elastic piece 840 corresponding to at least one of the plurality of adjustment members 831 and 832 is changed, thereby adjusting the position of the nozzle 820 with respect to the first case 810. For example, the first adjustment piece 831 and the second adjustment piece 832 may move with respect to the first case 810 to compress the first elastic piece 841 and the second elastic piece 842, respectively. When the length of the first elastic piece 841 compressed by the first adjustment piece 831 is the same as or similar to the length of the second elastic piece 842 compressed by the second adjustment piece 832, the nozzle 820 may move linearly with respect to the first case 810.

According to an embodiment, the plurality of adjustment pieces 831 and 832 may tilt the nozzle 820 by differently changing the length of the elastic piece 840 corresponding to one of the plurality of adjustment piece s 831 and 832 and the length of the elastic piece 840 corresponding to the other of the plurality of adjustment piece s 831. For example, the first adjustment piece 831 and the second adjustment piece 832 may move with respect to the first case 810 to compress the first elastic piece 841 and the second elastic piece 842, respectively. The first adjustment piece 831 may move in a direction toward the inner space 811 inside the first fastening groove 851a. As the first adjustment piece 831 moves toward the first fastening groove 851a, the first elastic piece 841 may be compressed by the first adjustment piece 831. By being pressed by the first adjustment piece 831, the length of the first elastic piece 841 may be changed from the first length L1 to the third length L3. The second adjustment piece 832 may move in a direction toward the inner space 811 inside the second fastening groove 852a. As the second adjusting piece 832 moves toward the second fastening groove 852a, the second elastic piece 842 may be compressed by the second adjusting piece 832. By being pressed by the second adjustment piece 832, the length of the second elastic piece 842 may be changed from the second length L2 to the fourth length L4. The length L3 of the first elastic piece 841 compressed by the first adjustment piece 831 may be shorter than the length L4 of the second elastic piece 842 compressed by the second adjustment piece 832. When the length L3 of the deformed first elastic piece 841 is different from the length L4 of the deformed second elastic piece 842, the nozzle 820 may be tilted with respect to the first case 810. For example, when the length of the first elastic piece 841 compressed by the first adjustment piece 831 is shorter than the length of the second elastic piece 842 compressed by the second adjustment piece 832, the position of the nozzle 820 may be changed from a first position D1 to a second position D2 and may be tilted with respect to the first case 810.

According to the above-described embodiment, the wearable device (e.g., the wearable device 100 of FIGS. 1A and/or 1B) may include an adjustment piece 830 for changing a position of the nozzle 820 with respect to the first case 810, thereby improving a user's wearing comfort. For example, the user may linearly move the nozzle 820 with respect to the first case 810 through the adjustment piece 830 so that the nozzle 820 is inserted deeply or shallowly into the external auditory meatus. For another example, the user may tilt the nozzle 820 with respect to the first case 810 through the adjustment piece 830 so that an angle θ formed by the nozzle 820 and the external auditory meatus is changed.

According to an example embodiment, a wearable device (e.g., the wearable device 100 of FIG. 1A) may comprise: a case (e.g., the case 210 of FIG. 1A) including an inner space (e.g., the inner space 201 of FIG. 2A) and including a through-hole (e.g., the through hole 213 of FIG. 2A and/or FIG. 2B) connecting the inner space and an outside of the wearable device; a speaker (e.g., the speaker 230 of FIGS. 1A and/or 1B) disposed within the case configured to output audio; and a nozzle (e.g., nozzle 300 of FIG. 1A and/or FIG. 1B) including audio path (e.g., the audio path 310 of FIG. 1B) extending from the inner space to the outside of the wearable device, inserted to the through-hole, and rotatably coupled to the case within the through-hole; wherein, the case may include a seating portion (e.g., the seating portion 260 of FIGS. 2A and/or 2B) supporting a part of the nozzle disposed inside the case and formed along the periphery of the through-hole; and a guide portion (e.g., the guiding portion 270 of FIGS. 2A and/or 2B) disposed in the seating portion and configured to guide rotation of the nozzle.

According to an example embodiment, a part of the nozzle may extend from an end of the nozzle in a radial direction of the through-hole and may include a flange (e.g., flanges 340 of FIGS. 2A and 2B) shape disposed on the seating portion.

According to an example embodiment, a cross-sectional shape of the through-hole may be circular, and wherein the nozzle may have a circular cross-section, have a coaxial axis with the through-hole, and be configured to rotate based on the through-hole.

According to an example embodiment, the guide portion may include a guiding protrusion (e.g., the guiding protrusion 271 of FIGS. 2A and/or 2B) protruding from one surface of the seating portion in contact with the part of the nozzle, and wherein the nozzle may further include a guiding groove (e.g., the guiding groove 350 of FIG. 2B) formed along the part of the nozzle, accommodating the guiding protrusion, and configured to guide the rotation of the nozzle.

According to an example embodiment, the guiding groove may be coaxial with the through-hole and extend along a part of a periphery of the through-hole so that the nozzle is configured to rotate based on the axis of the through-hole, and wherein the guiding protrusion may be configured to prevent and/or reduce the rotation of the nozzle by an end of the guiding groove.

According to an example embodiment, the guiding groove may include a plurality of positioning protrusions protruding from one sidewall (e.g., a plurality of sidewalls 361 and 362 of FIG. 3) among a plurality of sidewalls spaced apart from each other to another sidewall, wherein the plurality of the positioning protrusions (e.g., a plurality of positioning protrusions 371, 372, 373, and 374 of FIG. 3) may be spaced apart from each other along the one sidewall, and wherein the guiding protrusion may be disposed in one of the spaces between the plurality of the positioning protrusions.

According to an example embodiment, the plurality of the positioning protrusions may be configured to move the guiding protrusion positioned in one space of the spaces between the plurality of positioning protrusions, to another space of the space between the plurality of the positioning protrusions by the rotation of the nozzle.

According to an example embodiment, the nozzle may further include a plurality of fixing grooves (e.g., a plurality of fixing grooves 381, 382, and 383 of FIG. 4) disposed along the periphery of the part of the nozzle, wherein the guiding portion may include an elastic piece (e.g., the elastic member 272 of FIG. 4) including a fixing protrusion (e.g., fixing protrusion 272a of FIG. 4) disposed on the seating portion, protruding to the nozzle, and extending along at least part of the periphery of the seating portion, and wherein the plurality of fixing grooves may be configured to locate the fixing protrusion positioned in one fixing groove among the plurality of the fixing grooves to another fixing groove by the rotation of the nozzle.

According to an example embodiment, the seating portion may include a fixing piece (e.g., 261 in FIG. 4) disposed along the periphery of the seating portion and configured to fix both ends of the guiding portion.

According to an example embodiment, the nozzle may further include a tube (e.g., tube 320 of FIG. 5B) forming the audio path; and a holder (e.g., holder 390 of FIG. 5B) coupled to one end of the tube disposed in the case, and supporting the nozzle by a protruding portion (e.g., protruding portion 391 of FIG. 5B) extending from a periphery of the holder in a radial direction of the nozzle, the guiding portion may include a stopping groove (e.g., the stopping groove 273 of FIG. 6A) accommodating a part of the protruding portion and configured to limit a range of movement of the protruding portion.

According to an example embodiment, the stopping groove may be provided from a periphery of the through-hole toward a radial direction of the through-hole.

According to an example embodiment, the seating portion may include a first surface (e.g., the first surface 273b of FIG. 6B)) in contact with the protruding portion, a second surface (e.g., the second surface 273c of FIG. 6B)) distinct from the first surface and a step portion (e.g., the step portion 273a of FIG. 6B) disposed between the first surface and the second surface, and wherein the stopping groove may be formed by the step portion.

According to an example embodiment, the tube may include an opening (e.g., the opening 321 of FIG. 5B) formed on a side surface, and wherein the holder may be coupled to the tube by the protruding portion passing through the opening.

According to an example embodiment, the tube may comprise a bending portion (e.g., the bending portion 322 of FIG. 7A) formed by the other end of the tube bent in a radial direction of the audio path, wherein the nozzle may further comprise a fastening portion (e.g., the fastening portion 330 of FIG. 7A) into which the bending portion is inserted to be coupled to the tube, and wherein a part of the tube may be exposed outside of the wearable device so that the fastening portion is spaced apart from the case.

According to an example embodiment, a wearable device (e.g., the wearable device 800 of FIG. 8A) may comprise: a case (e.g., the first case 810 of FIG. 8B) including an inner space (e.g., the inner space 811 of FIG. 8B) and comprising a through-hole (e.g., through hole 812 of FIG. 9A) connecting the inner space and the outside of the wearable device; a speaker (e.g., speaker 230 of FIG. 1B) in the case and configured to output audio; a nozzle (e.g., nozzle 820 of FIG. 8A) coupled to a region (e.g., the first region 813 of FIG. 8B) of the case including the through-hole, and comprising an acoustic duct (e.g., the acoustic duct 821 of FIG. 9A) connecting the through-hole and an outside; a plurality of adjustment pieces configured to press one surface (e.g., one side 820a of FIG. 9A) of the nozzle, and passing through each of a plurality of fastening holes (e.g., a plurality of fastening hole 822a, 822b, and 822c of FIG. 8A) formed in the nozzle; and a plurality of elastic pieces (e.g., a plurality of elastic members 841, 842, and 843 of FIG. 8B) surrounding each of the plurality of the adjustment pieces (e.g., a plurality of adjustment members 831, 832, and 833 of FIG. 8B) and configured to press the other surface (e.g., the other side of FIG. 9A 820b) of the nozzle facing one surface of the nozzle; wherein, at least one of the plurality of adjustment pieces may be configured to move with respect to the case so that the length of the elastic piece corresponding to at least one of the plurality of adjustment pieces is changed to adjust the position of the nozzle with respect to the case.

According to an example embodiment, the case may comprise a plurality of accommodating portions (e.g., a plurality of accommodating portions 814a and 814b of FIG. 9A)) spaced apart from the through-hole, accommodating each of the plurality of the adjustment members and each of the plurality of the elastic pieces, and connected to each of the plurality of the fastening holes.

According to an example embodiment, the wearable device may further comprise a plurality of fastening portions (e.g., a plurality of fastening members 851, 852, and 853 of FIG. 8B) disposed in each of the plurality of the accommodation portions, each of the plurality of the adjustment pieces may be coupled to each of the plurality of the fastening portions.

According to an example embodiment, the plurality of adjustment pieces may be configured to tilt the nozzle by differently changing a length of the elastic piece corresponding to one of the plurality of the adjustment pieces and the length of the elastic piece corresponding to the other of the plurality of adjustment pieces.

According to an example embodiment, the wearable device may further comprise deformation portion (e.g., the deformation member 860 of FIG. 8B) disposed between the case and the nozzle and elastically supporting the nozzle.

According to an example embodiment, the deformation portion may comprise an acoustic hole (e.g., the sound hole 862 of FIG. 9A) connecting the through-hole (e.g., a plurality of through holes 861a and 861b of FIG. 9A) and the acoustic duct and a plurality of passing holes connected to each of the plurality of the fastening holes so that each of the plurality of the adjustment pieces pass, and the through-hole, and the acoustic hole, and the acoustic duct may form an audio transmission path configured to transmit the output audio to the outside.

The electronic device according to various embodiments disclosed in the present disclosure may be various types of devices. The electronic device may include, for example, a portable communication device (e.g., a smartphone), a computer device, a portable multimedia device, a portable medical device, a camera, a wearable device, a home appliance, or the like. The electronic device according to an embodiment of the present disclosure is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this disclosure, each of the phrases such as "A or B", "at least one of A and B", "at least one of A, B and C", "at least one of A, B, or C", and "at least one of A, B, or C" may include any one of the phrases together, or all possible combinations thereof. Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", some of the components can be connected directly (e.g., wired), wirelessly, or through a third component.

The term "module" used in various embodiments of the present disclosure may include a unit implemented in hardware, software, or firmware, or any combination thereof, and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present disclosure may be implemented as software (e.g., a program) including one or more instructions stored in a storage medium (or external memory) readable by a device (e.g., wearable device 100). For example, a processor (e.g., a processor) of a device (e.g., wearable device 100) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. The 'non-transitory' storage medium is a device that is tangible and may not include a signal (e.g., electromagnetic wave), and the term does not distinguish between a case where data is semi-permanently stored and a case where it is temporarily stored.

According to an embodiment, a method according to various embodiments disclosed in the present disclosure may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration. According to various embodiments, operations performed by a module, a program, or other components may be executed sequentially, in parallel, repeatedly, or heuristic, performed in a different order, omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable device comprising:
a case defining a through-hole;
a speaker disposed in the case; and
a nozzle extending via the through hole from an inside of the case to an outside of the case to provide audio path for providing audio from the speaker to the outside of the case,
wherein the nozzle is rotatably coupled to the case to enable rotating the nozzle with respect to the case based on an axis of the through-hole.

2. The wearable device of claim 1,
wherein the case includes a seating portion provided along a periphery of the through-hole and configured to support a part of the nozzle disposed in the case,
wherein the part of the nozzle extends from an end of the nozzle in a radial direction of the through-hole and comprises a flange shape disposed on the seating portion.

3. The wearable device of claim 1, further comprising:
an ear tip coupled to the nozzle,
wherein a cross-sectional shape of the through-hole is circular,
wherein the nozzle has a circular cross-section, and
wherein an axis of the nozzle is coaxial with an axis of the through-hole.

4. The wearable device of claim 1,
wherein the case includes:
a seating portion provided along a periphery of the through-hole and configured to support a part of the nozzle disposed in the case, and
a guiding portion including a guiding protrusion protruding from one surface of the seating portion in contact with the part of the nozzle,
wherein the nozzle includes a guiding groove formed along the part of the nozzle, accommodating the guiding protrusion, and
wherein the guiding protrusion and the guiding groove are configured to guide rotation of the nozzle.

5. The wearable device of claim 4,
wherein the guiding groove is coaxial with the through-hole and extends along a part of a periphery of the through-hole so that the nozzle is configured to rotate based on the axis of the through-hole, and
wherein the guiding protrusion is configured to inhibit rotation of the nozzle by an end of the guiding groove.

6. The wearable device of claim 4,
wherein the guiding groove includes a plurality of positioning protrusions protruding from one sidewall among a plurality of spaced apart sidewalls of the guiding groove,
wherein the plurality of positioning protrusions are spaced apart from each other along the one sidewall and wherein the guiding protrusion is configured to be disposed in one of the spaces between the plurality of the positioning protrusions.

7. The wearable device of claim 6,
wherein the guiding protrusion positioned in a first space of the spaces between the plurality of the positioning protrusions is movable, to a second space of the spaces between the plurality of the positioning protrusions based on rotation of the nozzle.

8. The wearable device of claim 1,
wherein the case includes:
a seating portion provided along a periphery of the through-hole and configured to support a part of the nozzle disposed in the case, and
a guiding portion including a guiding protrusion protruding from one surface of the seating portion in contact with the part of the nozzle,
wherein the nozzle includes a plurality of fixing grooves disposed along the periphery of the part of the nozzle,
wherein the guiding portion includes an elastic plate including a fixing protrusion disposed on the seating portion, protrudes to the nozzle, and extending along at least part of the periphery of the seating portion, and
wherein the plurality of fixing grooves are configured to locate the fixing protrusion positioned in a first fixing groove among the plurality of the fixing grooves to a second fixing groove based on rotation of the nozzle.

9. The wearable device of claim 1,
wherein the case includes:
a seating portion provided along a periphery of the through-hole and configured to support a part of the nozzle disposed in the case, and
a guiding portion including a guiding protrusion protruding from one surface of the seating portion in contact with the part of the nozzle, and
wherein the seating portion includes a fixing pieces disposed along the periphery of the seating portion configured to fix both ends of the guiding portion.

10. The wearable device of claim 1,
wherein the case includes:
a seating portion provided along a periphery of the through-hole and configured to support a part of the nozzle disposed in the case, and
a guiding portion including a guiding protrusion protruding from one surface of the seating portion in contact with the part of the nozzle,
wherein the nozzle further includes:
a tube forming the audio path, and
a holder coupled to one end of the tube disposed in the case, and supporting the nozzle by a protruding portion extending from a periphery of the holder in a radial direction of the nozzle, and
wherein the guiding portion includes a stopping groove accommodating a part of the protruding portion and configured to limit a range of movement of the protruding portion.

11. The wearable device of claim 10,
wherein the stopping groove is formed from a periphery of the through-hole toward a radial direction of the through-hole.

12. The wearable device of claim 10,
wherein the case includes:
a seating portion provided along a periphery of the through-hole and configured to support a part of the nozzle disposed in the case, and
a guiding portion including a guiding protrusion protruding from one surface of the seating portion in contact with the part of the nozzle,
wherein the seating portion includes a first surface in contact with the protruding portion, a second surface distinct from the first surface and a step portion disposed between the first surface and the second surface, and
wherein the stopping groove is formed by the step portion.

13. The wearable device of claim 10,
wherein the tube includes an opening formed on a side surface, and
wherein the holder is coupled to the tube by the protruding portion passing through the opening.

14. The wearable device of claim 10,
wherein the tube comprises a bending portion formed by the other end of the tube bent in a radial direction of the audio path,
wherein the nozzle comprises a fastener into which the bending portion is inserted to be coupled to the tube, and
wherein a part of the tube is exposed outside of the wearable device so that the fastener is spaced apart from the case.

15. A wearable device comprising:
a case including an inner space and comprising a through-hole connecting the inner space and an outside of the wearable device;
a speaker disposed in the case and configured to output audio;
a nozzle coupled to a region of the case including the through-hole, and comprising an acoustic duct connecting the through-hole and the outside;
a plurality of adjustment pieces configured to press one surface of the nozzle, and passing through each of a plurality of fastening holes formed in the nozzle; and
a plurality of elastic pieces surrounding each of the plurality of the adjustment pieces and configured to press the other surface of the nozzle facing one surface of the nozzle;
wherein at least one of the plurality of adjustment pieces is configured to move with respect to the case so that a length of the elastic piece corresponding to at least one of the plurality of adjustment pieces is changed to adjust a position of the nozzle with respect to the case.

16. The wearable device of claim 15,
wherein the case comprises a plurality of accommodating portions spaced apart from the through-hole, accommodating each of the plurality of the adjustment pieces and each of the plurality of the elastic pieces, and connected to each of the plurality of the fastening holes.

17. The wearable device of claim 16,
further comprising a plurality of fasteners disposed in each of the plurality of the accommodation portions, and
each of the plurality of the adjustment pieces are coupled to each of the plurality of the fasteners.

18. The wearable device of claim 15,
wherein the plurality of adjustment pieces are configured to tilt the nozzle by differently changing a length of an elastic piece corresponding to one of the plurality of the adjustment pieces and a length of an elastic piece corresponding to another of the plurality of adjustment pieces.

19. The wearable device of claim 15, further comprising:
a deformation portion disposed between the case and the nozzle and elastically supporting the nozzle.

20. The wearable device of claim 19,
wherein the deformation portion comprises:
- an acoustic hole connecting the through-hole and the acoustic duct; and
- a plurality of passing holes connected to each of the plurality of the fastening holes so that each of the plurality of the adjustment pieces pass, and the through-hole, and the acoustic hole, and the acoustic duct form an audio transmission path for transmitting the output audio to the outside.

* * * * *